US012497260B2

(12) United States Patent
Ishida

(10) Patent No.: US 12,497,260 B2
(45) Date of Patent: Dec. 16, 2025

(54) PRINTING APPARATUS

(71) Applicant: SEIKO EPSON CORPORATION, Tokyo (JP)

(72) Inventor: Tetsugo Ishida, Yamagata-Mura (JP)

(73) Assignee: Seiko Epson Corporation, Tokyo (JP)

( * ) Notice: Subject to any disclaimer, the term of this patent is extended or adjusted under 35 U.S.C. 154(b) by 443 days.

(21) Appl. No.: 18/059,310

(22) Filed: Nov. 28, 2022

(65) Prior Publication Data

US 2023/0166935 A1 Jun. 1, 2023

(30) Foreign Application Priority Data

Nov. 29, 2021 (JP) ................................. 2021-193476

(51) Int. Cl.
*B65H 26/08* (2006.01)
*B41J 15/04* (2006.01)
(Continued)

(52) U.S. Cl.
CPC .............. *B65H 26/08* (2013.01); *B41J 15/04* (2013.01); *B41J 15/042* (2013.01); *B65H 16/02* (2013.01);
(Continued)

(58) Field of Classification Search
CPC ... B41J 15/00; B41J 15/02; B41J 15/04; B41J 15/042; B41J 15/044; B41J 15/046;
(Continued)

(56) References Cited

U.S. PATENT DOCUMENTS 5,566,906 A * 10/1996 Kamada ................. B65H 23/34 242/615
5,820,068 A * 10/1998 Hosomi ................... B41J 11/70 242/563.2

(Continued)

FOREIGN PATENT DOCUMENTS

CN 201872418 U * 6/2011 ............ B41J 15/042
CN 208914817 U * 5/2019 ............ B41J 15/042

(Continued)

*Primary Examiner* — Anna M Momper
*Assistant Examiner* — Raveen J Dias
(74) *Attorney, Agent, or Firm* — WORKMAN NYDEGGER

(57) ABSTRACT

A printing apparatus includes a roll paper compartment 15 having a first placement surface 27 on which an outer peripheral surface Ra of a roll paper R around which a recording paper P is wound is placed and accommodating the roll paper R, a thermal head 67 performing printing on the recording paper P pulled out from the roll paper R accommodated in the roll paper compartment 15, a first projecting/retracting portion 77 provided to be configured to project from or retract into the first placement surface 27, pressed by the roll paper R of which the outer peripheral surface Ra is placed on the first placement surface 27 and retracting into the first placement surface 27 when a diameter of the roll paper R is larger than a predetermined diameter, and released from the pressure by the roll paper R and protruding from the first placement surface 27 when the diameter of the roll paper R is smaller than the predetermined diameter, and a detection section detecting projection and retraction of the first projecting/retracting portion 77.

14 Claims, 16 Drawing Sheets

(51) Int. Cl.
*B65H 16/02* (2006.01)
*B65H 23/00* (2006.01)

(52) U.S. Cl.
CPC ......... *B65H 16/028* (2013.01); *B65H 23/005* (2013.01); *B65H 2301/4137* (2013.01); *B65H 2301/41522* (2013.01); *B65H 2553/40* (2013.01); *B65H 2553/41* (2013.01); *B65H 2553/412* (2013.01); *B65H 2553/414* (2013.01); *B65H 2801/03* (2013.01); *B65H 2801/12* (2013.01); *B65H 2801/15* (2013.01)

(58) Field of Classification Search
CPC ...... B65H 26/08; B65H 16/02; B65H 16/028; B65H 23/005; B65H 2801/03; B65H 2801/09; B65H 2801/12; B65H 2801/15; B65H 2801/21; B65H 2553/40; B65H 2553/41; B65H 2553/412; B65H 2553/414; B65H 2301/4137; B65H 2301/41522
See application file for complete search history.

(56) References Cited

U.S. PATENT DOCUMENTS

| | | | | |
|---|---|---|---|---|
| 8,011,844 | B2 * | 9/2011 | Yada | B41J 11/0075 242/563.2 |
| 10,807,822 | B2 * | 10/2020 | Yamaya | B65H 19/10 |
| 2001/0014242 | A1 * | 8/2001 | Yamada | B65H 16/02 400/594 |
| 2002/0109037 | A1 * | 8/2002 | Mizuno | B41J 11/0075 242/563 |
| 2004/0234316 | A1 * | 11/2004 | Matsuse | B41J 15/042 400/613 |
| 2005/0002721 | A1 * | 1/2005 | Koyabu | B41J 15/042 400/613 |
| 2007/0036604 | A1 * | 2/2007 | Maekawa | B41J 29/13 400/615.2 |
| 2007/0091159 | A1 * | 4/2007 | Chaussade | B41J 15/042 347/108 |
| 2008/0095564 | A1 * | 4/2008 | Yada | B41J 15/042 400/613 |
| 2008/0173750 | A1 * | 7/2008 | Takeuchi | B41J 15/042 242/564.1 |
| 2008/0310903 | A1 * | 12/2008 | Kohyama | B41J 11/0045 400/613 |
| 2010/0247217 | A1 * | 9/2010 | Tsugaru | B41J 15/042 400/582 |
| 2011/0164913 | A1 * | 7/2011 | Tsugaru | B41J 11/0075 400/582 |
| 2012/0055272 | A1 * | 3/2012 | Sanada | B41J 15/042 73/865.8 |
| 2012/0224904 | A1 * | 9/2012 | Nihashi | B41J 15/042 242/563.2 |
| 2012/0224905 | A1 * | 9/2012 | Nihashi | B65H 26/08 400/583 |
| 2015/0151555 | A1 * | 6/2015 | Huang | B65H 26/08 347/110 |
| 2016/0009108 | A1 * | 1/2016 | Nakayama | B41J 11/0095 347/16 |
| 2017/0080722 | A1 * | 3/2017 | Yada | B41J 13/103 |
| 2017/0121142 | A1 * | 5/2017 | Hagi | B41J 15/04 |
| 2017/0259594 | A1 * | 9/2017 | Chiba | B41J 29/13 |
| 2018/0104967 | A1 * | 4/2018 | Yada | B41J 15/04 |
| 2021/0060986 | A1 * | 3/2021 | Kobayashi | B41J 11/0025 |
| 2022/0097421 | A1 * | 3/2022 | Matsunaga | B41J 11/0095 |
| 2022/0242687 | A1 * | 8/2022 | Ooi | B41J 15/04 |
| 2022/0299930 | A1 * | 9/2022 | Daimon | B65H 16/02 |
| 2022/0355599 | A1 * | 11/2022 | Hirama | B41J 11/004 |
| 2023/0166538 | A1 * | 6/2023 | Ishida | G03G 15/6529 347/16 |

FOREIGN PATENT DOCUMENTS

| | | | | |
|---|---|---|---|---|
| JP | H11-129590 | | 5/1999 | |
| JP | 2003145857 A | * | 5/2003 | B41J 11/42 |
| JP | 2008-120069 | | 5/2008 | |
| JP | 2013-166617 A | | 8/2013 | |

* cited by examiner

PRINTING APPARATUS

The present application is based on, and claims priority from JP Application Serial Number 2021-193476, filed Nov. 29, 2021, the disclosure of which is hereby incorporated by reference herein in its entirety.

BACKGROUND

1. Technical Field

The present disclosure relates to a printing apparatus.

2. Related Art

In the related art, as disclosed in JP-A-2013-166617, there is known a printer provided with a detection means for detecting a near-end state of a roll paper around which a recording paper as a print medium is wound, that is, a state where there is little remaining recording paper. This detection means is a light reflection type sensor provided on a side wall of a paper storage in which the roll paper is stored. That is, the detection means has a light emitter that emits light toward a side end surface of the roll paper, and a light receiver that receives light reflected by the side end surface of the roll paper.

In a printer of the related art, a sensor receives light reflected by a roll paper to detect a near-end state of the roll paper. Therefore, for example, when a roll paper guide is mounted between the roll paper and a side wall of a paper storage due to narrow roll paper, a space between the roll paper and the sensor is obstructed, and thus, the detection of the near-end state of the roll paper is hindered.

SUMMARY

According to an aspect of the present disclosure, there is provided a printing apparatus including: a roll paper compartment having a placement surface on which an outer surface of a roll paper is placed and accommodating the roll paper; a printing section performing printing on a recording paper pulled out from the roll paper accommodated in the roll paper compartment; a projecting/retracting portion configured to project from or retract into the placement surface; and a detection section detecting projection and retraction of the projecting/retracting portion, wherein the projecting/retracting portion is pressed by the roll paper of which the outer surface is placed on the placement surface and retracts into the placement surface when a diameter of the roll paper is larger than a predetermined diameter, and wherein the projecting/retracting portion is released from the pressure by the roll paper and projects from the placement surface when the diameter of the roll paper is smaller than the predetermined diameter.

DESCRIPTION OF EXEMPLARY EMBODIMENTS

A printing apparatus 1, which is an embodiment of a printing apparatus, will be described below with reference to the accompanying drawings. The printing apparatus 1 is used, for example, as a receipt printer. In the following description, directions of an XYZ orthogonal coordinate system illustrated in each drawing will be used, but these directions are for convenience of explanation only and do not limit the following embodiments in any way. A+X direction is an example of a "right direction", a −X direction is an example of a "left direction", a +Y direction is an example of a "rearward direction", a −Y direction is an example of a "forward direction", a +Z direction is an example of the "upward direction", and the −Z direction is an example of the "downward direction".

Appearance Configuration of Printing Apparatus

Figure 1:
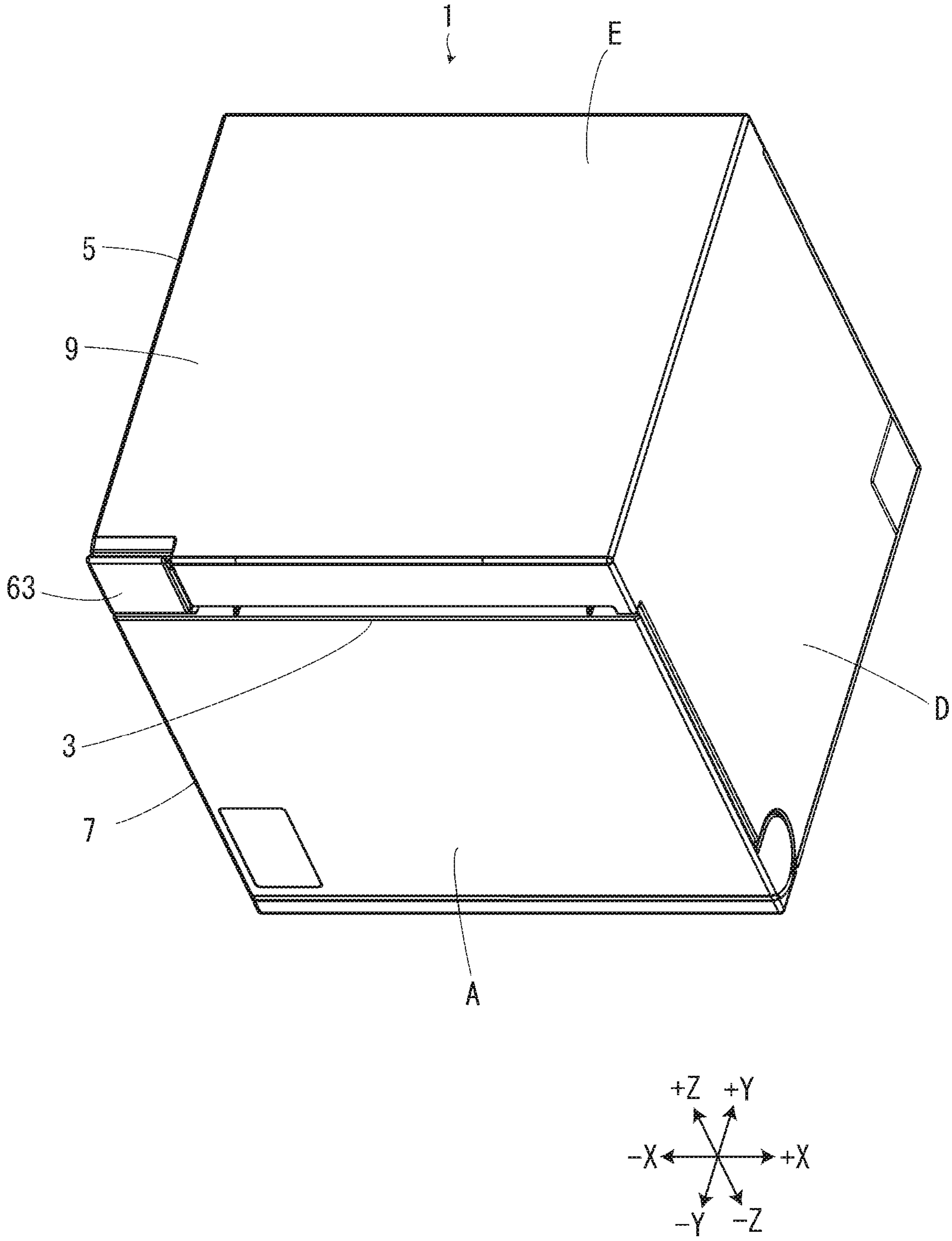
FIG. 1 is a perspective view of a printing apparatus.
Figure 2:
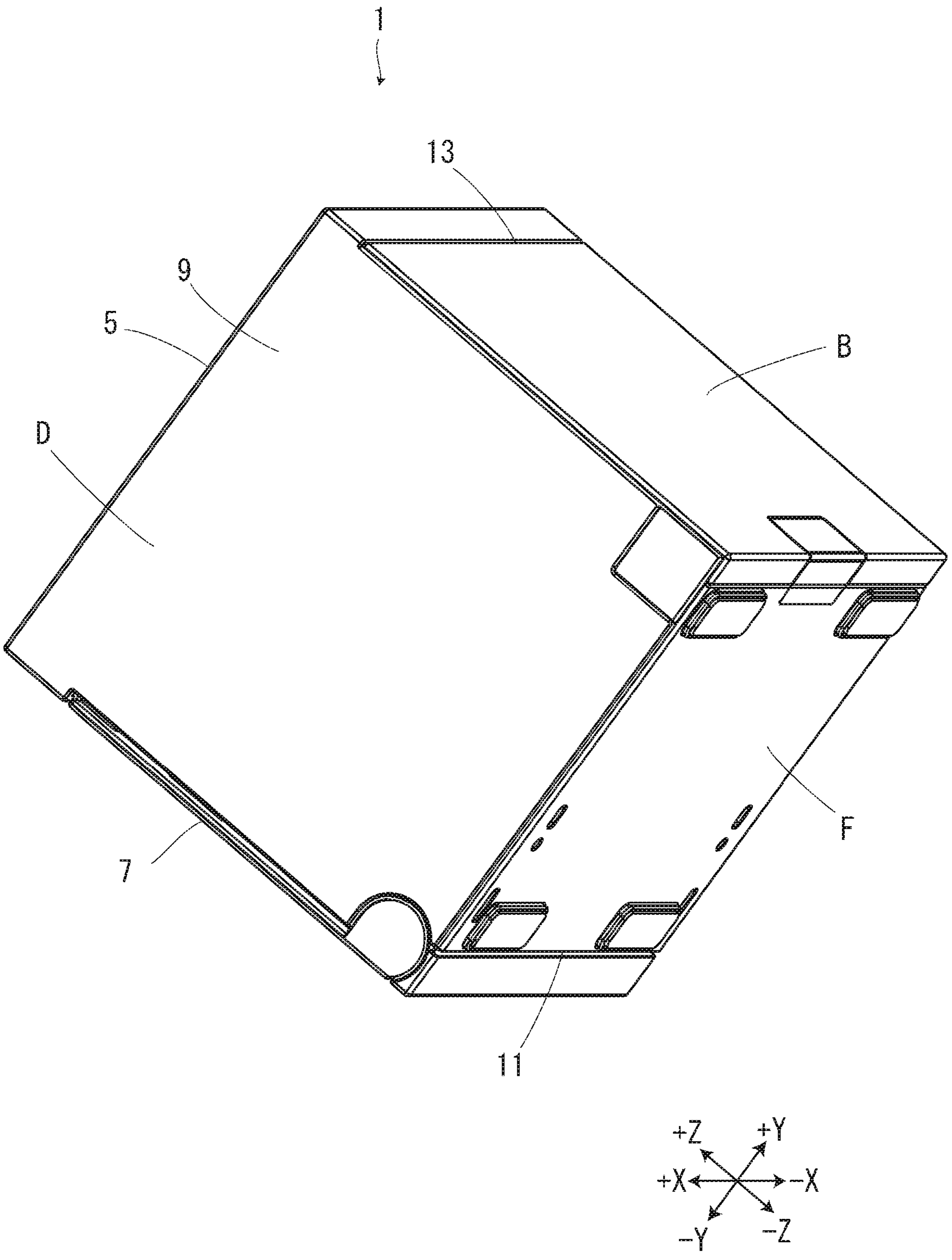
FIG. 2 is a perspective view of the printing apparatus seen from a different angle than FIG. 1.

As illustrated in FIGS. 1 and 2, the printing apparatus 1 is formed in a substantially rectangular parallelepiped shape, and has a first surface A, a second surface B, a third surface C (refer to FIG. 9), and a fourth surface D, a fifth surface E, and a sixth surface F. The first surface A is provided with an ejection port 3. A printed recording paper P is ejected from the ejection port 3 (refer to FIG. 11). When the printing apparatus 1 is installed in a posture in which the first surface A faces the −Y direction and the ejection port 3 is located at an end of the first surface A in the +Z direction, a surface facing the +Y direction is referred to as the second surface B, a surface facing the −X direction is referred to as the third surface C, a surface facing the +X direction is referred to as the fourth surface D, a surface facing the +Z direction is referred to as the fifth surface E, and a surface facing the −Z direction is referred to as the sixth surface F.

The printing apparatus 1 can be installed in a first posture (refer to FIG. 11) in which the first surface A provided with the ejection port 3 faces the −Y direction, and a second posture (refer to FIG. 14) in which the first surface A faces the +Z direction. Therefore, when a user wants to eject the recording paper P in the −Y direction, the user may install the printing apparatus 1 in the first posture in which the ejection port 3 faces the −Y direction, and when user wants to eject the recording paper P in the +Z direction, the user may install the printing apparatus 1 in the second posture in which the ejection port 3 faces the +Z direction.

In the following description, unless otherwise specified, directions in an XYZ orthogonal coordinate system mean directions in the printing apparatus 1 installed in the first posture. In FIGS. 1 to 13, the XYZ orthogonal coordinate system illustrated in each drawing represents the direction of the printing apparatus 1 installed in the first posture, and in FIGS. 14 to 16, the XYZ orthogonal coordinate system illustrated in each drawing represents the direction of the printing apparatus 1 installed in the second posture.

The printing apparatus 1 includes a device case 5 and an opening/closing cover 7. The device case 5 constitutes an outer shell of the printing apparatus 1, and is formed in a box shape with an open surface in the −Y direction. The device case 5 includes a case body 9, a bottom cover 11 and a rear cover 13. When the printing apparatus 1 is installed in the first posture, the bottom cover 11 is mounted on the sixth surface F facing the −Z direction, and the rear cover 13 is mounted on the second surface B facing the +Y direction. When the printing apparatus 1 is installed in the second posture, the bottom cover 11 is mounted on the second surface B facing the −Z direction, and the rear cover 13 is mounted on the sixth surface F facing the +Y direction (refer to FIG. 14). A roll paper compartment 15 (refer to FIG. 3) is provided in the device case 5.

Roll Paper Compartment

Figure 3:
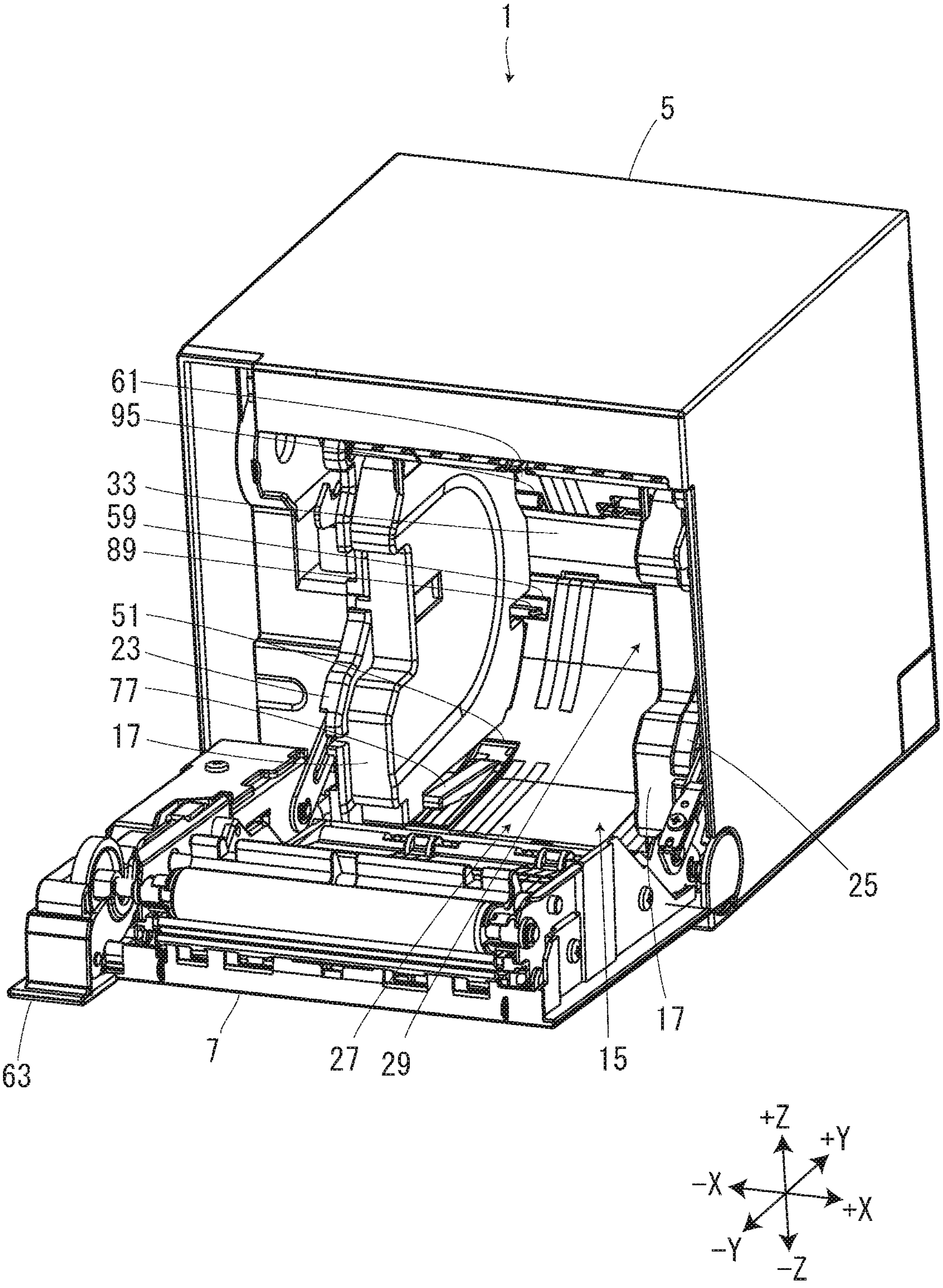
FIG. 3 is a perspective view of the printing apparatus illustrating a state in which a roll paper guide is mounted on a roll paper compartment.
Figure 4:
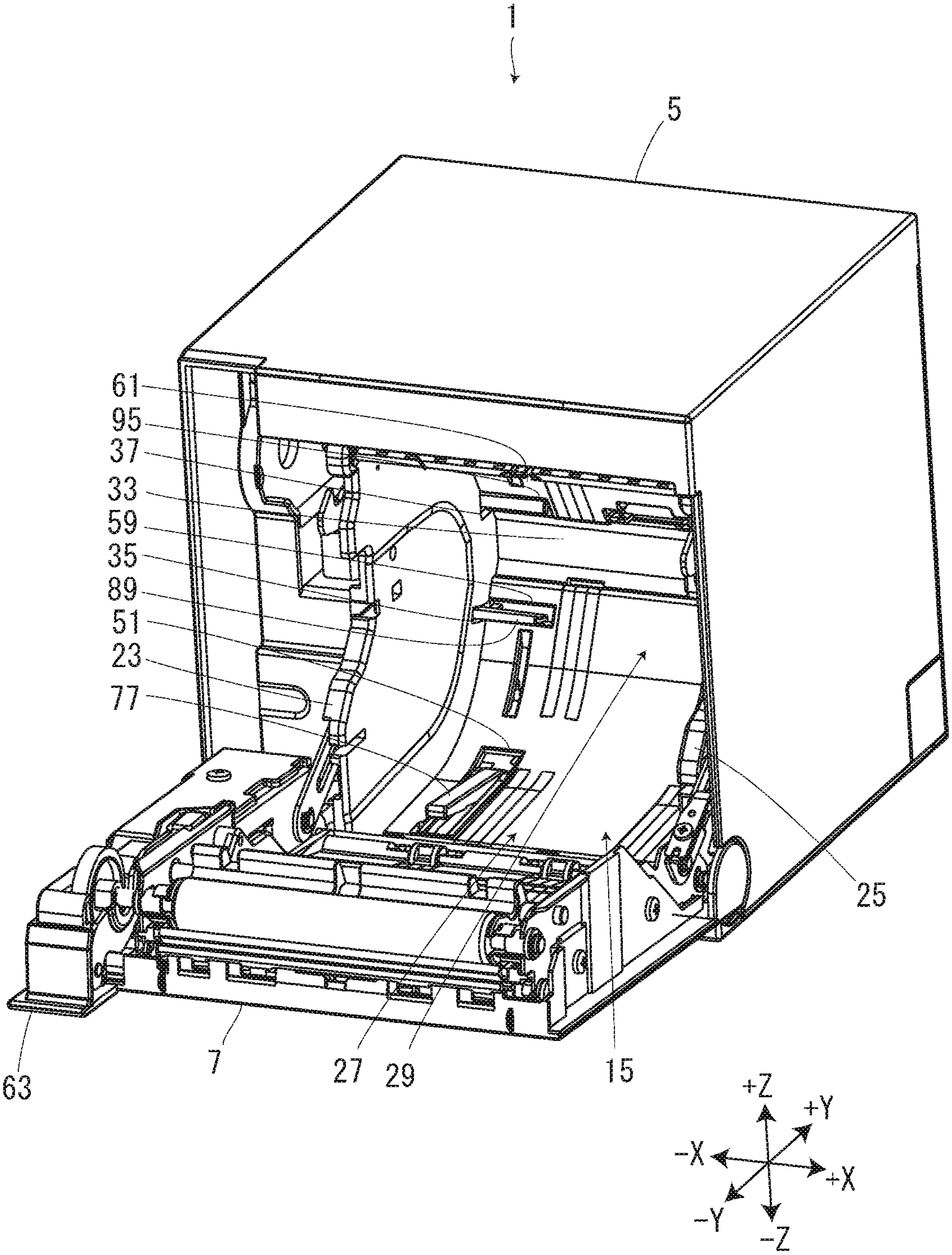
FIG. 4 is a perspective view of the printing apparatus illustrating a state in which the roll paper guide is removed from the roll paper compartment.

As illustrated in FIGS. 3 and 4, the roll paper compartment 15 accommodates roll paper R (refer to FIG. 11) around which recording paper P as a print medium is wound. The roll paper R is loaded into the roll paper compartment 15 by a drop-in method so that a rotation axis direction of the roll paper R is parallel to the X direction.

The roll paper compartment 15 can alternatively accommodate the roll paper R having a first width and the roll paper R having a second width larger than the first width. In addition, the first width is, for example, 58 mm, and the second width is, for example, 80 mm.

When the roll paper R having the first width is accommodated in the roll paper compartment 15, two roll paper guides 17 are mounted in the roll paper compartment 15 (refer to FIG. 3), and when the roll paper R having the second width is accommodated in the roll paper compartment 15, the two roll paper guides 17 are removed from the roll paper compartment 15 (refer to FIG. 4). The two roll paper guides 17 are plate-shaped, and are mounted in the roll paper compartment 15 to be distributed into an end in the +X direction and an end in the −X direction. Therefore, a center of the roll paper R in a width direction when the roll paper R having the first width is accommodated in the roll paper compartment 15 and a center of the roll paper R in the width direction when the roll paper R having the second width is accommodated in the roll paper compartment 15 substantially coincide with each other.

The roll paper compartment 15 includes a first side wall 23, a second side wall 25, a first placement surface 27, a second placement surface 29, a first recess 31 (refer to FIG. 6), and a second recess 33.

The first side wall 23 and the second side wall 25 are provided side by side in the X direction, and the second side wall 25 is located in the +X direction with respect to the first side wall 23. At an end of the first side wall 23 in the +Y direction, a projecting/retracting recess 35 that allows a second projecting/retracting portion 89 described later to be projected and retracted, and a suppressing recess 37 that allows a second suppressor 95 described later to be projected and retracted are provided. (refer to FIG. 6).

The two roll paper guides 17 are mounted between the first side wall 23 and the second side wall 25. When the two roll paper guides 17 are mounted in the roll paper compartment 15 and the roll paper R having the first width is accommodated in the roll paper compartment 15, both side end surfaces (not illustrated) of the roll paper R located between the two roll paper guides 17 are in sliding contact with the roll paper guides 17. When the two roll paper guides 17 are removed from the roll paper compartment 15 and the roll paper R having the second width is accommodated in the roll paper compartment 15, both side end surfaces of the roll paper R located between the first side wall 23 and the second side wall 25 are in sliding contact with the first side wall 23 and the second side wall 25.

The first placement surface 27 and the second placement surface 29 are provided between the first side wall 23 and the second side wall 25. The first placement surface 27 is located in the −Z direction in the roll paper compartment 15, and the second placement surface 29 is located in the +Y direction in the roll paper compartment 15. A wall having the first placement surface 27 is referred to as a first wall 41, and a wall having the second placement surface 29 is referred to as a second wall 43 (refer to FIG. 6).

Figure 11:
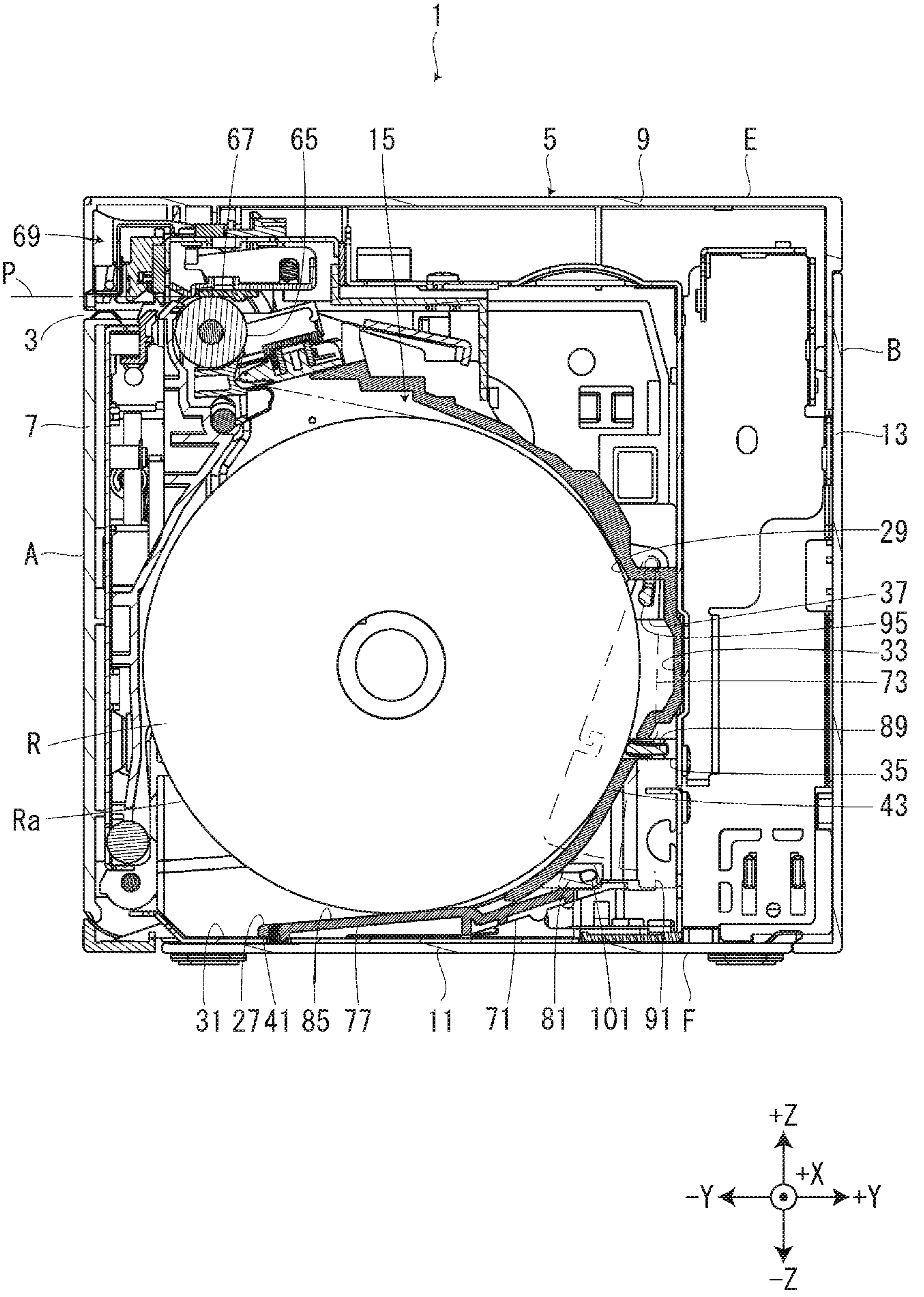
FIG. 11 is a cross-sectional view illustrating a state in which a diameter of the roll paper accommodated in the roll paper compartment is larger than a third diameter in the printing apparatus installed in a first posture.

The first placement surface 27 serves as a bottom of the roll paper compartment 15 when the printing apparatus 1 is installed in the first posture, and an outer peripheral surface Ra (an outer surface) of the roll paper R is placed on the first placement surface 27 (refer to FIG. 11). The first placement surface 27 is inclined toward the first recess 31. That is, the first placement surface 27 is an inclined surface in which the end in the −Y direction is located in the −Z direction compared to the end in the +Y direction (refer to FIG. 6).

Figure 5:
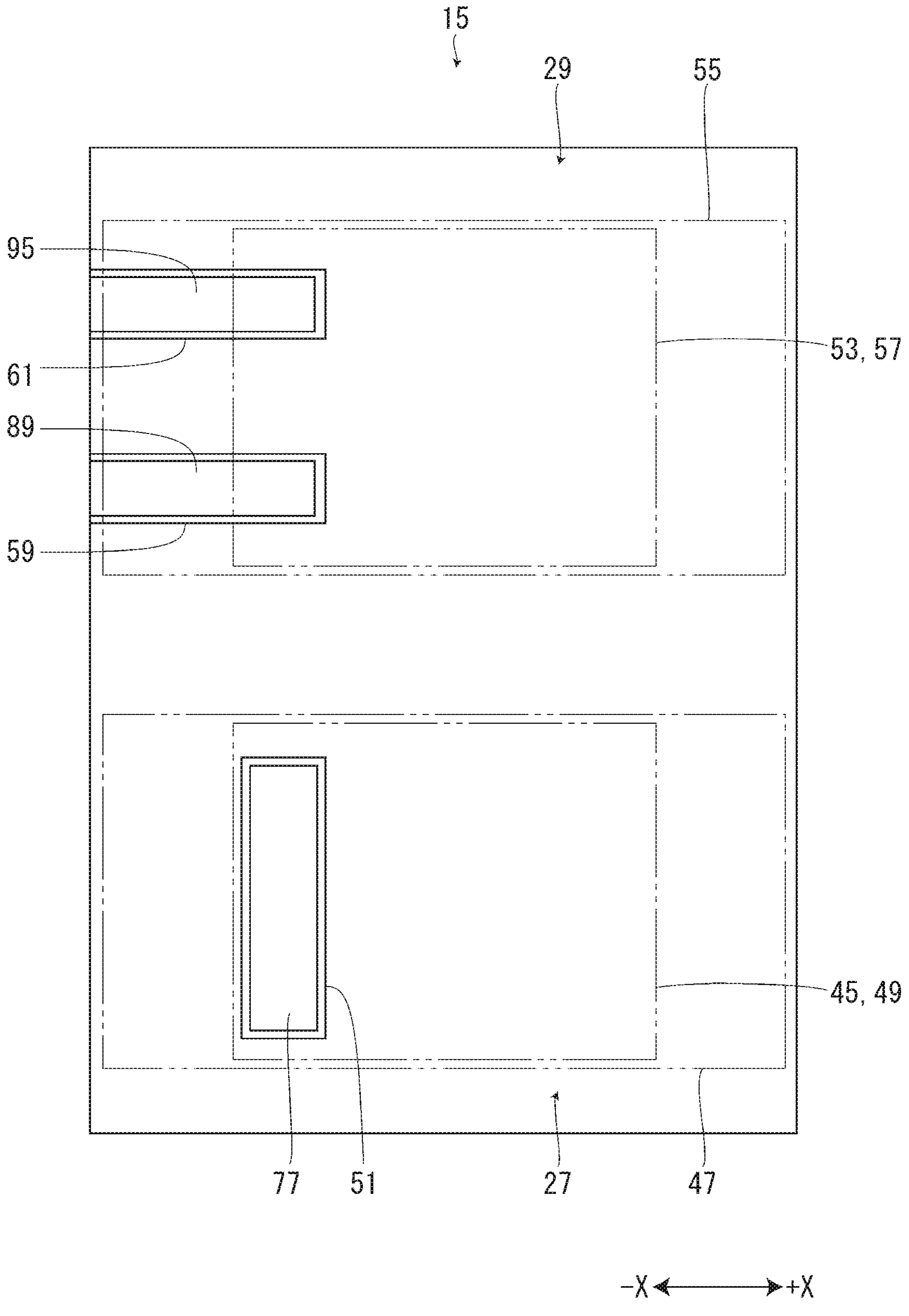
FIG. 5 is a view schematically illustrating a first overlapping region and a second overlapping region.

A region of the first placement surface 27 on which the outer peripheral surface Ra of the roll paper R having the first width is placed is referred to as a first narrow region 45, and a region of the first placement surface 27 on the outer peripheral surface Ra of the roll paper R having the second width is placed is referred to as a first wide region 47 (refer to FIG. 5). A region where the first narrow region 45 and the first wide region 47 overlap is referred to as a first overlapping region 49. In the present embodiment, the first narrow region 45 is entirely included in the first wide region 47, and thus, the first overlapping region 49 coincide with the first narrow region 45.

Further, the first placement surface 27 is provided with a first entrance/exit opening 51 spaced apart from the first side wall 23 in the +X direction. The first entrance/exit opening 51 is provided in the first overlapping region 49 of the first placement surface 27. The first entrance/exit opening 51 is formed in a substantially rectangular shape elongated in the Y direction. A first projecting/retracting portion 77 described later projects from or retracts into the first entrance/exit opening 51.

Of the two roll paper guides 17, the roll paper guide 17 in the −X direction is provided between the first side wall 23 and the first entrance/exit opening 51. Therefore, even when two roll paper guides 17 are mounted in the roll paper compartment 15, it is possible to prevent the projection/retraction of the first projecting/retracting portion 77 from being obstructed by the roll paper guide 17 in the −X direction.

Figure 14:
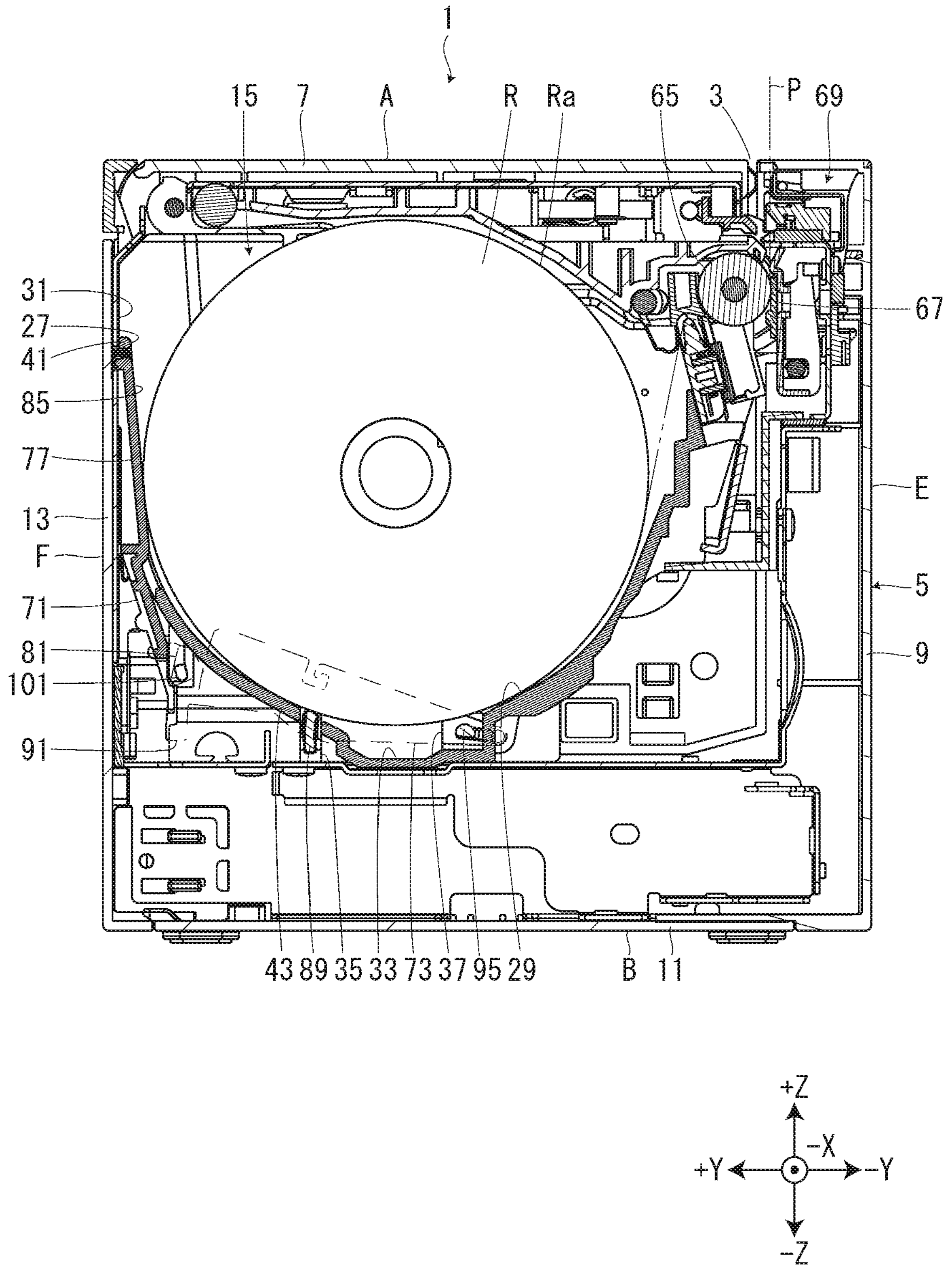
FIG. 14 is a cross-sectional view illustrating a state in which the diameter of the roll paper accommodated in the roll paper compartment is larger than a fourth diameter in the printing apparatus installed in a second posture.

The second placement surface 29 serves as the bottom of the roll paper compartment 15 when the printing apparatus 1 is installed in the second posture, and the outer peripheral surface Ra of the roll paper R is placed on the second placement surface 29 (refer to FIG. 14). The second placement surface 29 is formed in a substantially arc-shaped curved surface.

A region of the second placement surface 29 on which the outer peripheral surface Ra of the roll paper R having the first width is placed is referred to as a second narrow region 53, and a region of the second placement surface 29 on which the outer peripheral surface Ra of the roll paper R having the second width is placed is referred to as a second wide region 55 (refer to FIG. 5). A region where the second narrow region 53 and the second wide region 55 overlap is referred to as a second overlapping region 57. In the present embodiment, the second narrow region 53 is entirely included in the second wide region 55, and thus, the second overlapping region 57 coincides with the second narrow region 53.

The second placement surface 29 is provided with a second entrance/exit opening 59 and a second restraint opening 61 located in the +X direction with respect to the first side wall 23. A portion of the second entrance/exit opening 59 and a portion of the second restraint opening 61 are provided in the second overlapping region 57 of the second placement surface 29. The second entrance/exit opening 59 is provided in the −Z direction with respect to the second recess 33, and is formed in a substantially rectangular shape elongated in the X direction. The second projecting/retracting portion 89 described later projects from or retracts into the second entrance/exit opening 59. The second restraint opening 61 is provided in the +Z direction with respect to the second recess 33 and has a substantially rectangular shape elongated in the X direction. The second suppressor 95 described later projects from or retracts into the second restraint opening 61.

The first recess 31 is provided between the first placement surface 27 and the opening/closing cover 7. The first recess 31 extends in the X direction in a groove shape.

The second recess 33 is provided at a portion located in the most +Y direction of the second placement surface 29 curved in a substantially arc shape, that is, the most bottom portion when the printing apparatus 1 is installed in the second posture. The second recess 33 extends in the X direction in a groove shape.

Opening/Closing Cover

The opening/closing cover 7 opens and closes the roll paper compartment 15. The opening/closing cover 7 is attached to an end of the device case 5 in the −Z direction to be rotatable about an axis substantially parallel to the X direction. The ejection port 3 is provided at a distal end of the opening/closing cover 7, that is, between the end in the +Z direction and the device case 5. The ejection port 3 is formed in a substantially rectangular shape elongated in the X direction. Further, an open lever 63 is provided at a corner of the first surface A in the −X direction and the +Z direction (refer to FIG. 1). The user can open the opening/closing cover 7 by operating the open lever 63.

Internal Configuration of Printing Apparatus

Figure 6:
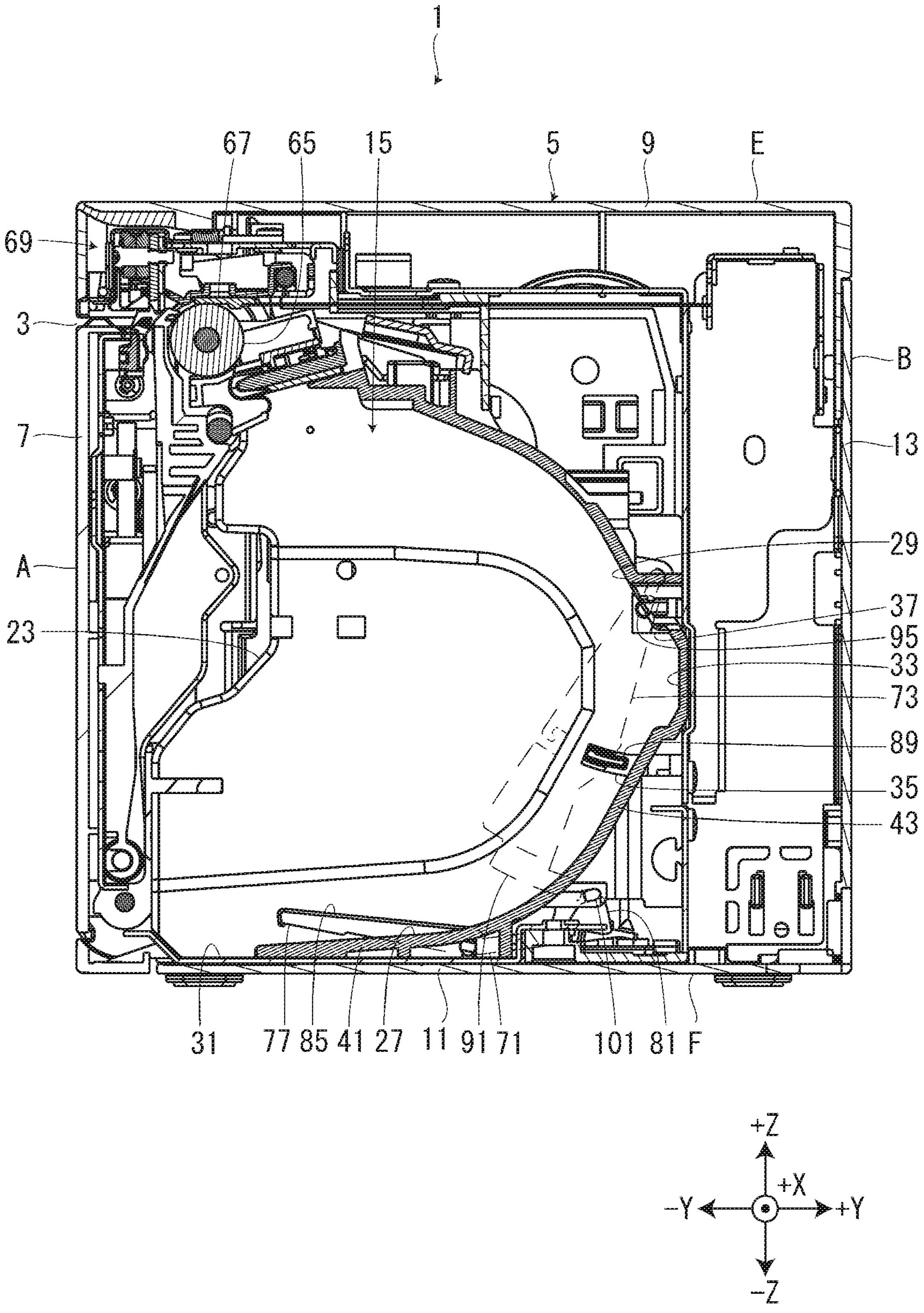
FIG. 6 is a cross-sectional view of the printing apparatus.

As illustrated in FIG. 6, the printing apparatus 1 includes a platen roller 65, a thermal head 67, an auto cutter 69, a first rotating lever 71, a second rotating lever 73, and an optical sensor 75 (refer to FIG. 9) and a control circuit (not illustrated).

The platen roller 65 is provided inside the opening/closing cover 7 so that a rotation axis direction is substantially parallel to the X direction. The recording paper P is sandwiched between the platen roller 65 and the thermal head 67, and the platen roller 65 rotates with a feed motor (not illustrated) as a drive source.

Accordingly, the recording paper P is pulled out from the roll paper R accommodated in the roll paper compartment 15 and fed toward the ejection port 3. When the printing apparatus 1 is installed in the first posture, the recording paper P is pulled out from the +Y direction on the roll paper R (refer to FIG. 11). When the printing apparatus 1 is installed in the second posture, the recording paper P is pulled out from the roll paper R in the −Y direction (refer to FIG. 14).

The thermal head 67 is provided inside the device case 5 to face the platen roller 65. The thermal head 67 includes a plurality of heating elements (not illustrated), and performs printing on the recording paper P pulled out from the roll paper R.

The auto cutter 69 is provided in the vicinity of the ejection port 3, and cuts the recording paper P in the width direction of the recording paper P, that is, in the X direction behind a printed portion, using a cutter motor (not illustrated) as a drive source. More specifically, the auto cutter 69 cuts the recording paper P so that the cut recording paper P remains in the ejection port 3, leaving a substantially central portion of the recording paper P in the width direction.

The first rotating lever 71, the second rotating lever 73, and the optical sensor 75 are used to detect a near-end state of the roll paper R.

The first rotating lever 71 is provided in the −Z direction with respect to the roll paper compartment 15. The first rotating lever 71 extends in the Y direction and is provided to be rotatable in a seesaw shape with a substantially intermediate portion in the Y direction as a fulcrum. The second rotating lever 73 is provided in the −X direction with respect to the roll paper compartment 15. The second rotating lever 73 extends in the Z direction and is provided to be rotatable about an end in the +Z direction as a fulcrum. The optical sensor 75 is provided outside the roll paper compartment 15 and located in the +Y direction and the −Z direction with respect to the roll paper compartment 15 (refer to FIG. 9).

First Rotating Lever

Figure 7:
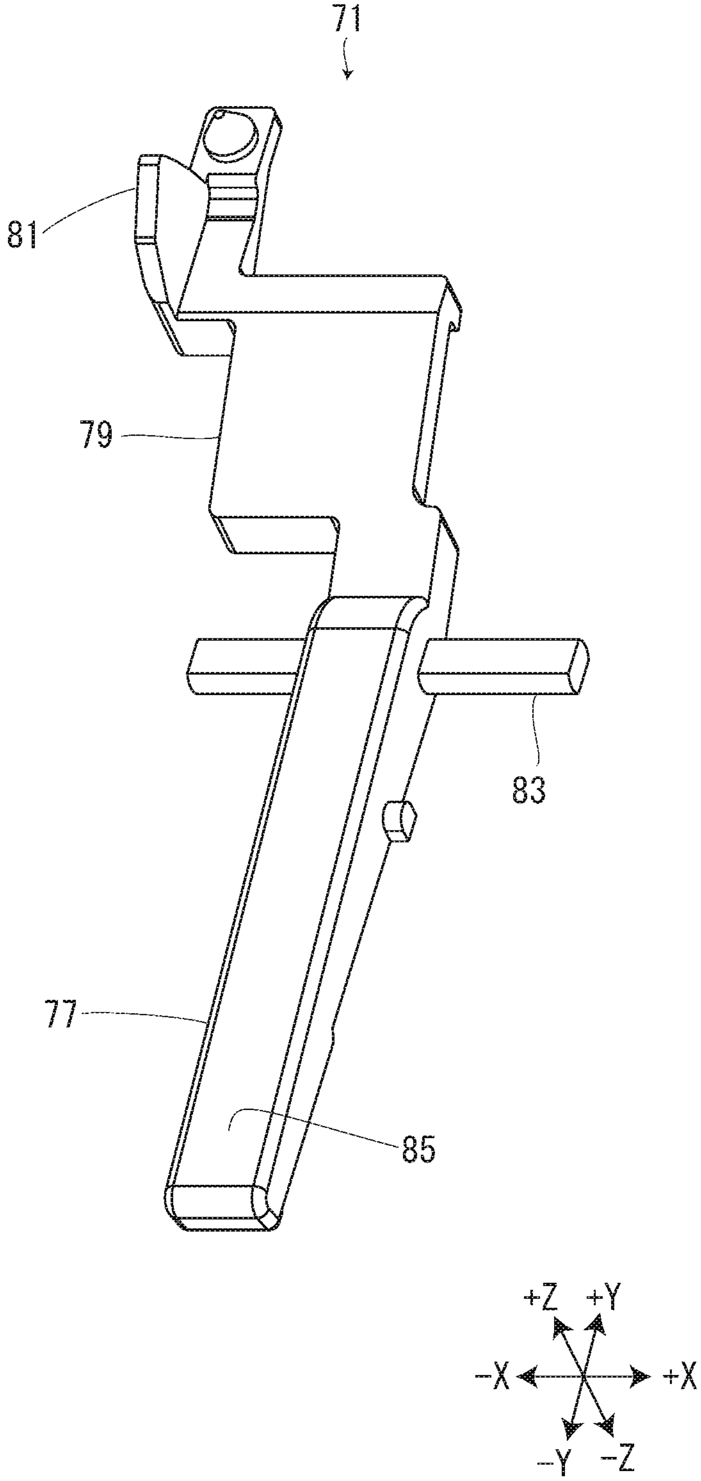
FIG. 7 is a perspective view of a first rotating lever.

As illustrated in FIG. 7, the first rotating lever 71 includes the first projecting/retracting portion 77, a first coupler 79, a first blocking portion 81 and a first shaft portion 83.

The first projecting/retracting portion 77 constitutes approximately half of the first rotating lever 71 in the −Y direction, and is formed in a wedge shape extending in the Y direction. The first projecting/retracting portion 77 rotates about the first shaft portion 83 to project from or retract into the first entrance/exit opening 51 provided in the first placement surface 27. The first projecting/retracting portion 77 projects from or retracts into the first overlapping region 49 of the first placement surface 27. Here, the first projecting/retracting portion 77 projecting or retracting from the first overlapping region 49 means that at least a part of the first projecting/retracting portion 77 projects from or retracts into the first overlapping region 49. The first projecting/retracting portion 77 may be described as a "first contact portion" that comes into contact with the outer peripheral surface Ra of the roll paper R. The first projecting/retracting portion 77 may be described as a "first protrusion" that protrudes from the first placement surface 27.

Of the first projecting/retracting portion 77, the first projecting/retracting surface 85 on which the outer peripheral surface Ra of the roll paper R is placed is substantially flush with the first placement surface 27 when the first projecting/retracting portion 77 is retracted into the first placement surface 27 (refer to FIG. 11). In other words, when the first projecting/retracting portion 77 is retracted to the first placement surface 27, the first projecting/retracting portion 77 is substantially flush with the first placement surface 27. A thickness of the first projecting/retracting portion 77 is substantially equal to a thickness of the first wall 41 (refer to FIG. 13). Therefore, since the thickness of the first wall 41 can be used to provide the first projecting/retracting portion 77, a space inside the device case 5 can be saved.

The first coupler 79 constitutes approximately half of the first rotating lever 71 in the +Y direction, and is formed in a substantially rectangular plate shape. The first coupler 79 couples the first projecting/retracting portion 77 and the first blocking portion 81.

The first blocking portion 81 protrudes in the +Z direction from ends of the first coupler 79 in the −X direction and the +Y direction, and is formed in a substantially polygonal plate shape. The first blocking portion 81 rotates integrally with the first projecting/retracting portion 77 about the first shaft portion 83 to block (refer to FIG. 9) or open (refer to FIG. 10) a space between a light guide tube 101 and a light receiving element 99 described later.

The first shaft portion 83 extends in the X direction to pass through substantially a center portion of the first rotating lever 71 in the Y direction. The first rotating lever 71 rotates about the first shaft portion 83. A force is applied to the first rotating lever 71 by a first spring (not illustrated) in a direction in which the first projecting/retracting portion 77 protrudes from the first placement surface 27, that is, clockwise when viewed from the +X direction.

Second Rotating Lever

Figure 8:
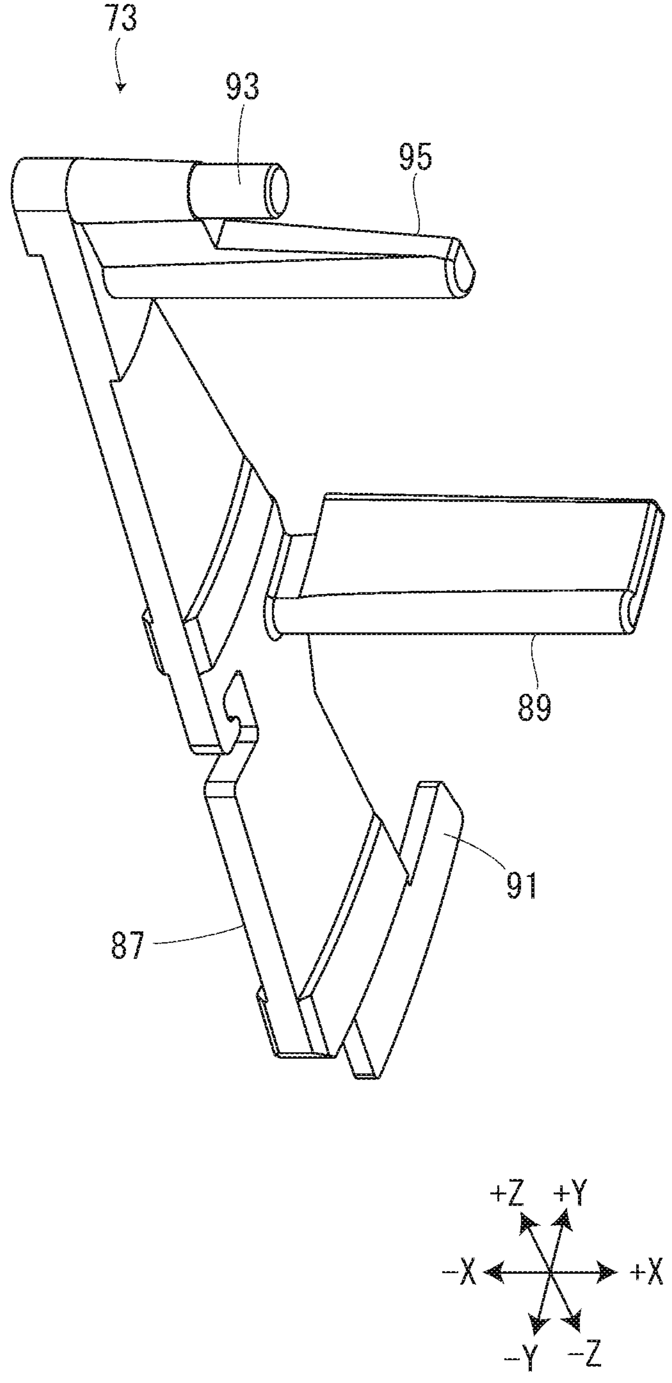
FIG. 8 is a perspective view of a second rotating lever.

As illustrated in FIG. 8, the second rotating lever 73 includes a second fan portion 87, the second projecting/retracting portion 89, a second blocking portion 91, a second shaft portion 93, and a second suppressor 95.

The second fan portion 87 is formed in a substantially fan-shaped plate shape and is provided substantially parallel to the YZ plane.

The second projecting/retracting portion 89 protrudes in the +X direction from a substantially intermediate portion of the second fan portion 87 in the Z direction, that is, a radial direction of the second fan portion 87. The second projecting/retracting portion 89 is formed in a substantially rectangular plate shape and is provided substantially parallel to the XY plane. The second projecting/retracting portion 89 rotates around the second shaft portion 93 to project from or retract into the second entrance/exit opening 59 provided in the second placement surface 29. The second projecting/retracting portion 89 projects from or retracts into the second overlapping region 57 of the second placement surface 29. Here, the second projecting/retracting portion 89 projecting or retracting from the second overlapping region 57 means that at least a part of the second projecting/retracting portion 89 projects from or retracts into the second overlapping region 57. The second projecting/retracting portion 89 may be described as a "second contact portion" that comes into contact with the outer peripheral surface Ra of the roll paper R. The second projecting/retracting portion 89 may be described as a "second protrusion" that protrudes from the second placement surface 29.

The second blocking portion 91 is provided radially outside the second fan portion 87. The second blocking portion 91 is formed in a substantially arcuate plate shape and is provided substantially parallel to the YZ plane. The second blocking portion 91 rotates integrally with the second projecting/retracting portion 89 about the second shaft portion 93 to block (refer to FIG. 9) or open (refer to FIG. 10) the space between the light guide tube 101 and the light receiving element 99 described later.

The second shaft portion 93 protrudes in the +X direction from an end of the second fan portion 87 in the +Z direction. The second rotating lever 73 rotates about the second shaft portion 93. A force is applied to the second rotating lever 73 by a second spring (not illustrated) in a direction in which the second projecting/retracting portion 89 protrudes from the second placement surface 29, that is, clockwise when viewed from the +X direction.

The second suppressor 95 is located between the second shaft portion 93 and the second projecting/retracting portion 89 and protrudes from the second fan portion 87 in the +X direction in a substantially semi-columnar shape. The second suppressor 95 rotates about the second shaft portion 93 integrally with the second projecting/retracting portion 89 to project from or retract into the second restraint opening 61 provided in the second placement surface 29. In addition, the second suppressor 95 projects from or retracts into the second overlapping region 57 of the second placement surface 29. Here, the second suppressor 95 projecting or retracting from the second overlapping region 57 means that at least a part of the second suppressor 95 projects from or retracts into the second overlapping region 57.

Optical Sensor

Figure 9:
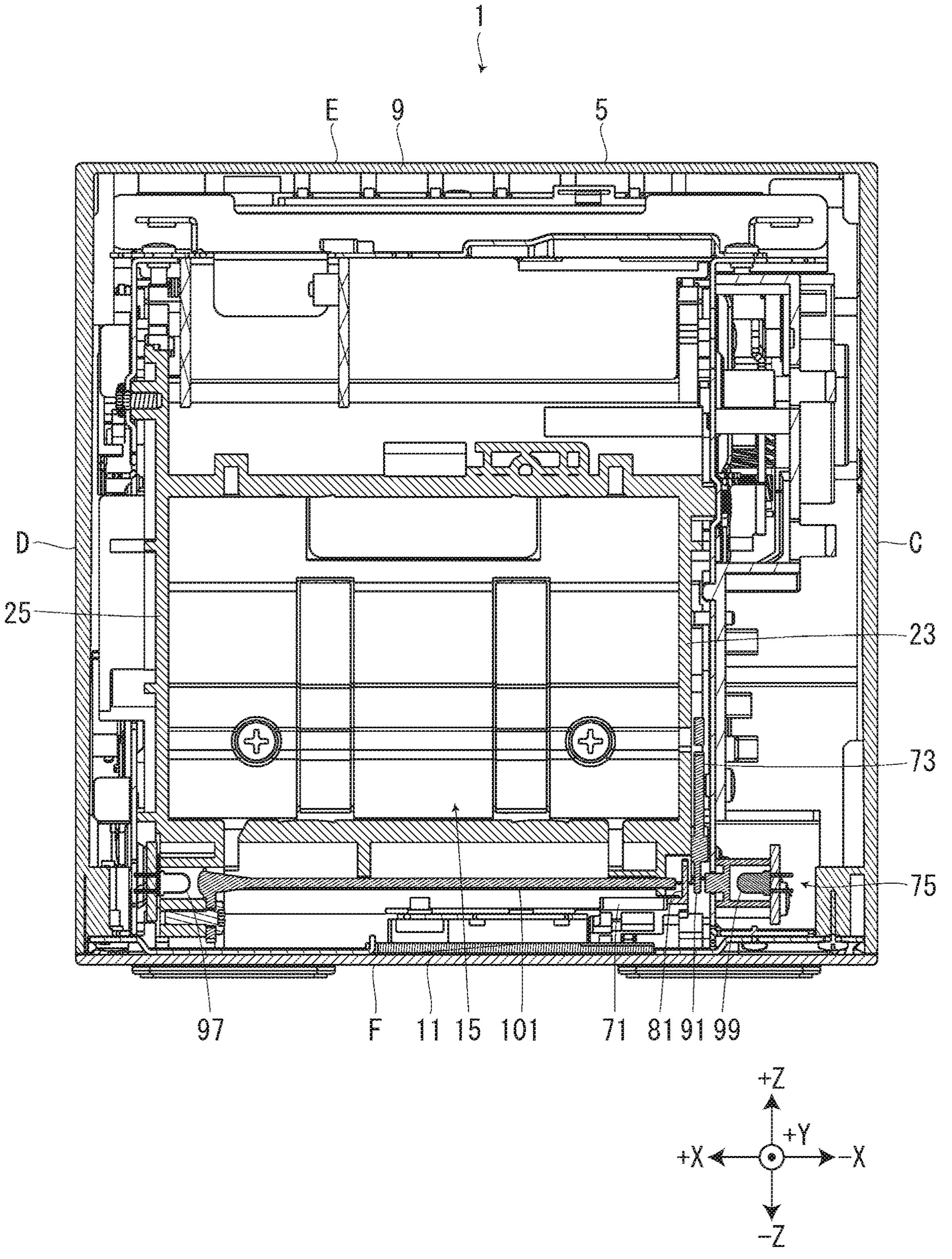
FIG. 9 is a cross-sectional view of the printing apparatus illustrating a state in which a space between a light guide tube and a light receiving element is blocked.
Figure 10:
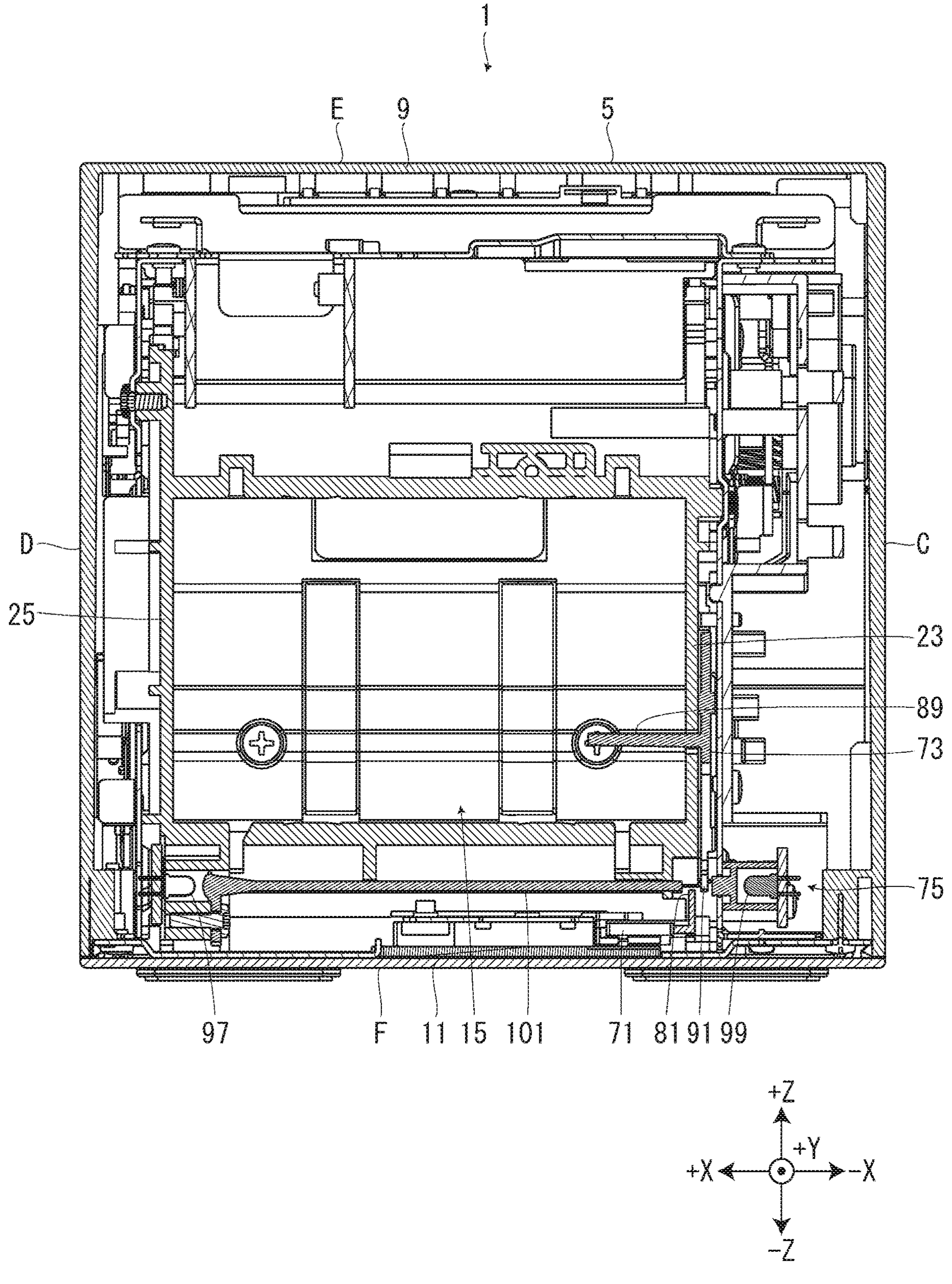
FIG. 10 is a cross-sectional view of the printing apparatus illustrating a state in which the space between the light guide tube and the light receiving element is opened.

As illustrated in FIGS. 9 and 10, the optical sensor 75 is a light transmission sensor and includes a light emitting element 97, the light receiving element 99, and the light guide tube 101.

The light emitting element 97 is provided in the −Z direction with respect to the second side wall 25. The light emitting element 97 emits detection light in the −X direction toward the light receiving element 99. The light receiving element 99 is provided in the −X direction with respect to the light emitting element 97. The light receiving element 99 receives the detection light emitted from the light emitting element 97. The light guide tube 101 is located between the light emitting element 97 and the light receiving element 99 and extends in the X direction. The light guide tube 101 guides the detection light emitted from the light emitting element 97 to the light receiving element 99. Although the optical sensor 75 may be configured without the light guide tube 101, when the light guide tube 101 is provided, the light receiving element 99 can receive the detection light when a distance between the light emitting element 97 and the light receiving element 99 increases, and thus, it is possible to increase a degree of freedom in arrangement of the light emitting element 97 and the light receiving element 99.

Since the optical sensor 75 is provided outside the roll paper compartment 15, paper dust generated from the roll paper R accommodated in the roll paper compartment 15 is less likely to reach the optical sensor 75, and thus, it is possible to suppress reduction in detection accuracy of the optical sensor 75 due to the paper dust on the optical sensor 75. The light receiving element 99 is located in the −X direction with respect to the first side wall 23 in the X direction. That is, the light receiving element 99 is located outside the roll paper R in a paper width direction of the roll paper R accommodated in the roll paper compartment 15. Therefore, it is possible to further prevent paper dust generated from the roll paper R accommodated in the roll paper compartment 15 from being applied to the light receiving element 99. Of the light emitting element 97 and the light receiving element 99, only the light emitting element 97 may be configured to be located outside the roll paper R in the paper width direction of the roll paper R, and both the light emitting element 97 and the light receiving element 99 may be configured to be located outside the roll paper R in the paper width direction of the roll paper R.

When a space between the light guide tube 101 and the light receiving element 99, that is, a space between the light emitting element 97 and the light receiving element 99 is blocked by at least the first blocking portion 81 and the second blocking portion 91 and the detection light emitted from the light emitting element 97 is not received by the light receiving element 99, the optical sensor 75 configured as described above outputs a first signal. When the space between the light guide tube 101 and the light receiving element 99, that is, the space between the light emitting element 97 and the light receiving element 99 is not blocked by any one of the first blocking portion 81 and the second blocking portion 91 and the detection light emitted from the light emitting element 97 is received by the light receiving element 99, the optical sensor 75 outputs a second signal.

The control circuit includes a processor and memory, and controls the entire printing apparatus 1 in an integrated manner. For example, based on the signal received from the optical sensor 75, the control circuit determines whether the roll paper R is in the near-end state. That is, when the control circuit receives the first signal from the optical sensor 75, the control circuit determines that the roll paper R is not in the near-end state. When the control circuit receives the second signal from the optical sensor 75, the control circuit determines that the roll paper R is in the near-end state. When the control circuit determines that the roll paper R is in the near-end state, the control circuit controls the notification means so as to notify the user that the roll paper R is in the near-end state. As the notification means, for example, a lamp, a display, a speaker, or the like provided in the printing apparatus 1 can be used.

When Printing Apparatus is Installed in First Posture

Figure 12:
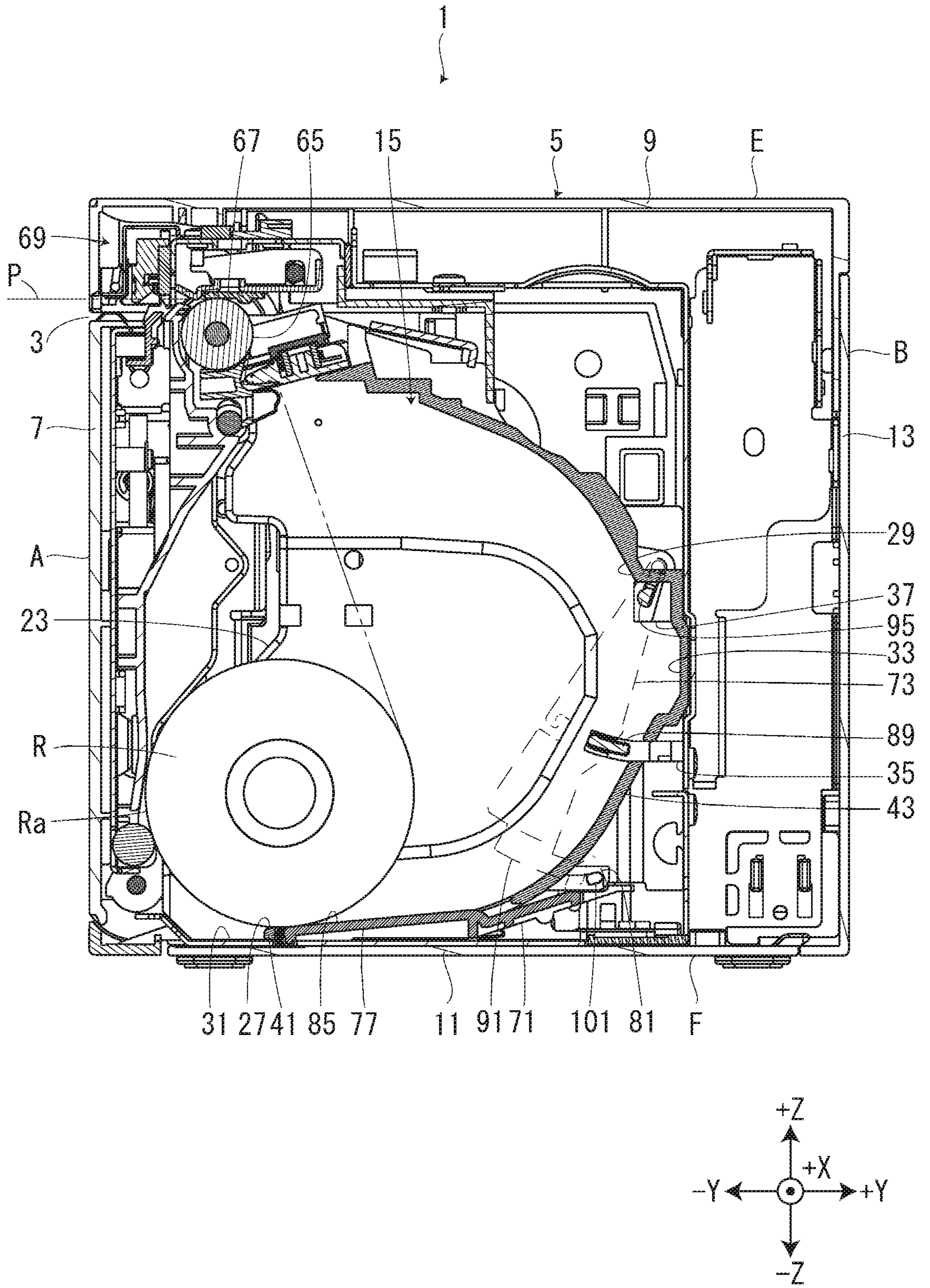
FIG. 12 is a cross-sectional view illustrating a state in which the diameter of roll paper accommodated in the roll paper compartment is smaller than the third diameter and larger than a first diameter in the printing apparatus installed in the first posture.
Figure 13:
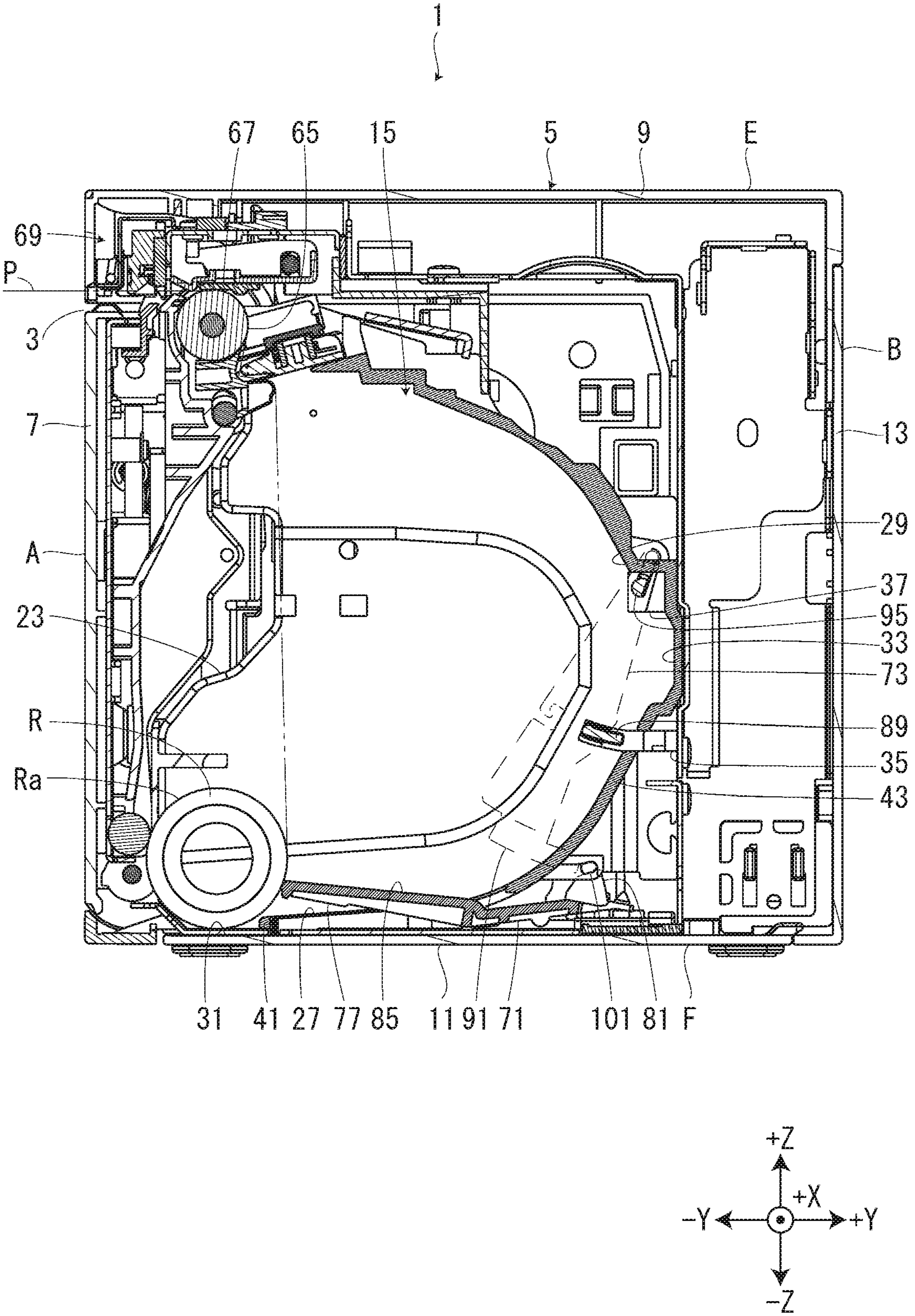
FIG. 13 is a cross-sectional view illustrating a state in which the diameter of the roll paper accommodated in the roll paper compartment is smaller than the first diameter in the printing apparatus installed in the first posture.

Referring to FIGS. 11 to 13, when the printing apparatus 1 is installed in the first posture, as the recording paper P is consumed and a diameter of the roll paper R decreases, how the first rotating lever 71 and the second rotating lever 73 operates will be explained. In the following description, a first diameter means is a diameter of the roll paper R that serves as a threshold for determining whether or not the first projecting/retracting portion 77 protrudes from the first placement surface 27 when the printing apparatus 1 is installed in the first posture. A third diameter means a diameter of the roll paper R that serves as a threshold for determining whether or not the second projecting/retracting portion 89 protrudes from the second placement surface 29 when the printing apparatus 1 is installed in the first posture. The first diameter is smaller than the third diameter. When the diameter of the roll paper R is smaller than the first diameter, it can be said that the roll paper R has reached the near-end state.

As illustrated in FIG. 11, when an unused roll paper R, that is, the roll paper R having a diameter larger than the third diameter is loaded into the roll paper compartment 15 and the outer peripheral surface Ra of the roll paper R is placed on the first placement surface 27, the first projecting/retracting portion 77 is pressed by the roll paper R and retracted into the first placement surface 27, and the second projecting/retracting portion 89 is pressed by the roll paper R and retracted into the second placement surface 29. Accordingly, the first blocking portion 81 blocks the space between the light guide tube 101 and the light receiving element 99, and the second blocking portion 91 blocks the space between the light guide tube 101 and the light receiving element 99. Therefore, the optical sensor 75 outputs the first signal. Based on the first signal received from the optical sensor 75, the control circuit determines that the near-end state is not reached.

In addition, as described above, the first projecting/retracting portion 77 projects from or retracts into the first placement surface 27 in the first overlapping region 49. Therefore, both when the roll paper R having the first width is accommodated in the roll paper compartment 15 and when the roll paper R having the second width is accommodated in the roll paper compartment 15, the first projecting/retracting portion 77 is pushed by the outer peripheral surface Ra of the roll paper R and retracted into the first placement surface 27. Similarly, the second projecting/retracting portion 89 projects from or retracts into the second placement surface 29 in the second overlapping region 57. Therefore, both when the roll paper R having the first width is accommodated in the roll paper compartment 15 and when the roll paper R having the second width is accommodated in the roll paper compartment 15, the second projecting/retracting portion 89 is pushed by the outer peripheral surface Ra of the roll paper R and retracted into the second placement surface 29. This is the same when the printing apparatus 1 is installed in the second posture, which will be described later.

As illustrated in FIG. 12, when the recording paper P is consumed to some extent and the diameter of the roll paper R is larger than the first diameter but smaller than the third diameter, the second projecting/retracting portion 89 is released from the pressure by the roll paper R and protrudes from the second placement surface 29. Meanwhile, the first projecting/retracting portion 77 is pressed by the roll paper R and remains retracted into the first placement surface 27. In this case, the second blocking portion 91 opens the space between the light guide tube 101 and the light receiving element 99, but the first blocking portion 81 keeps blocking the space between the light guide tube 101 and the light receiving element 99. Therefore, the optical sensor 75 outputs the first signal. The control circuit determines that the roll paper R is not in the near-end state based on the first signal received from the optical sensor 75.

As illustrated in FIG. 13, when the recording paper P is further consumed and the diameter of the roll paper R is smaller than the first diameter, the first projecting/retracting portion 77 is released from the pressure by the roll paper R, and protrudes from the first placement surface 27. The second projecting/retracting portion 89 remains protruding from the second placement surface 29. In this case, the first blocking portion 81 opens the space between the light guide tube 101 and the light receiving element 99. The second blocking portion 91 keeps the space between the light guide tube 101 and the light receiving element 99 open. Therefore, when the diameter of the roll paper R is smaller than the first diameter, the optical sensor 75 outputs the second signal.

The control circuit determines that the roll paper R is in the near-end state based on the second signal received from the optical sensor 75. As described above, when the printing apparatus 1 is installed in the first posture, the second projecting/retracting portion 89 and the first projecting/retracting portion 77 protrude in this order as the diameter of the roll paper R decreases.

When the printing apparatus 1 is installed in the first posture, the roll paper R moves in the −Y direction toward the opening/closing cover 7 due to the inclination of the first placement surface 27 as the diameter of the roll paper R decreases. The roll paper R also moves in the −Y direction even when the recording paper P is pulled in the −Y direction and the +Z direction by the platen roller 65. Then, when the diameter of the roll paper R is smaller than the first diameter, the roll paper R enters the first recess 31 (refer to FIG. 13). The roll paper R entering the first recess 31 means that the outer peripheral surface Ra of the roll paper R is in contact with a bottom surface of the first recess 31. Therefore, when the user opens the opening/closing cover 7 to replace the roll paper R, a winding core of the roll paper R whose diameter is smaller than the first diameter, that is, the roll paper R in the near-end state or the roll paper R in an end state enters the first recess 31 provided between the first placement surface 27 and the opening/closing cover 7. Accordingly, it is possible to easily take out the winding core of the roll paper R in the near-end state or the roll paper R in the end state.

After the roll paper R moves in the −Y direction and enters the first recess 31, the first projecting/retracting portion 77 protruding from the first placement surface 27 is located in the +Y direction with respect to the roll paper R. (refer to FIG. 13). Therefore, the first projecting/retracting portion 77 protruding from the first placement surface 27 prevents the roll paper R from moving in the +Y direction from the first recess 31. As a result, it is possible to prevent the first projecting/retracting portion 77 from being pressed by the roll paper R that has moved in the +Y direction from the first recess 31 and retracted into the first recess 31 again, and it is possible to suppress erroneous detection that the roll paper R is not in the near-end state.

Here, when the diameter of the roll paper R is large, that is, when the weight of the roll paper R is large, a portion of the first projecting/retracting portion 77 that comes into sliding contact with the roll paper R is likely to be worn due to the sliding contact with the roll paper R. When the portion of the first projecting/retracting portion 77 that comes into sliding contact with the roll paper R when the diameter of the roll paper R approaches the first diameter is worn, before the diameter of the roll paper R is smaller than the first diameter, the first projecting/retracting portion 77 projects from or retracts into the first placement surface 27, and thus, the roll paper R is erroneously detected as being in the near-end state before the roll paper R reaches the near-end state.

In contrast, in the present embodiment, as the diameter of the roll paper R decreases, the roll paper R moves in the −Y direction. Accordingly, the portion of the first projecting/retracting portion 77 that comes into sliding contact with the outer peripheral surface Ra of the roll paper R is displaced in the −Y direction as the diameter of the roll paper R decreases. That is, when the diameter of the roll paper R is larger than the third diameter, a proximal end of the first projecting/retracting portion 77 comes in sliding contact with the roll paper R (refer to FIG. 11), but when the diameter of the roll paper R approaches the first diameter, the distal end of the first projecting/retracting portion 77 comes into sliding contact with the roll paper R (refer to FIG. 12). In this manner, the first projecting/retracting portion 77 is divided into the portion that comes into sliding contact with the roll paper R when the diameter of the roll paper R is large and the portion that comes into sliding contact with the roll paper R when the diameter of the roll paper R decreases. As a result, when the diameter of the roll paper R approaches the first diameter, the portion that comes into sliding contact with the roll paper R, that is, the distal end of the first projecting/retracting portion 77, can be prevented from being worn due to friction with the roll paper R. Therefore, it is possible to suppress erroneous detection that the roll paper R is in the near-end state before the roll paper R reaches the near-end state.

When Printing Apparatus is Installed in Second Posture

Figure 15:
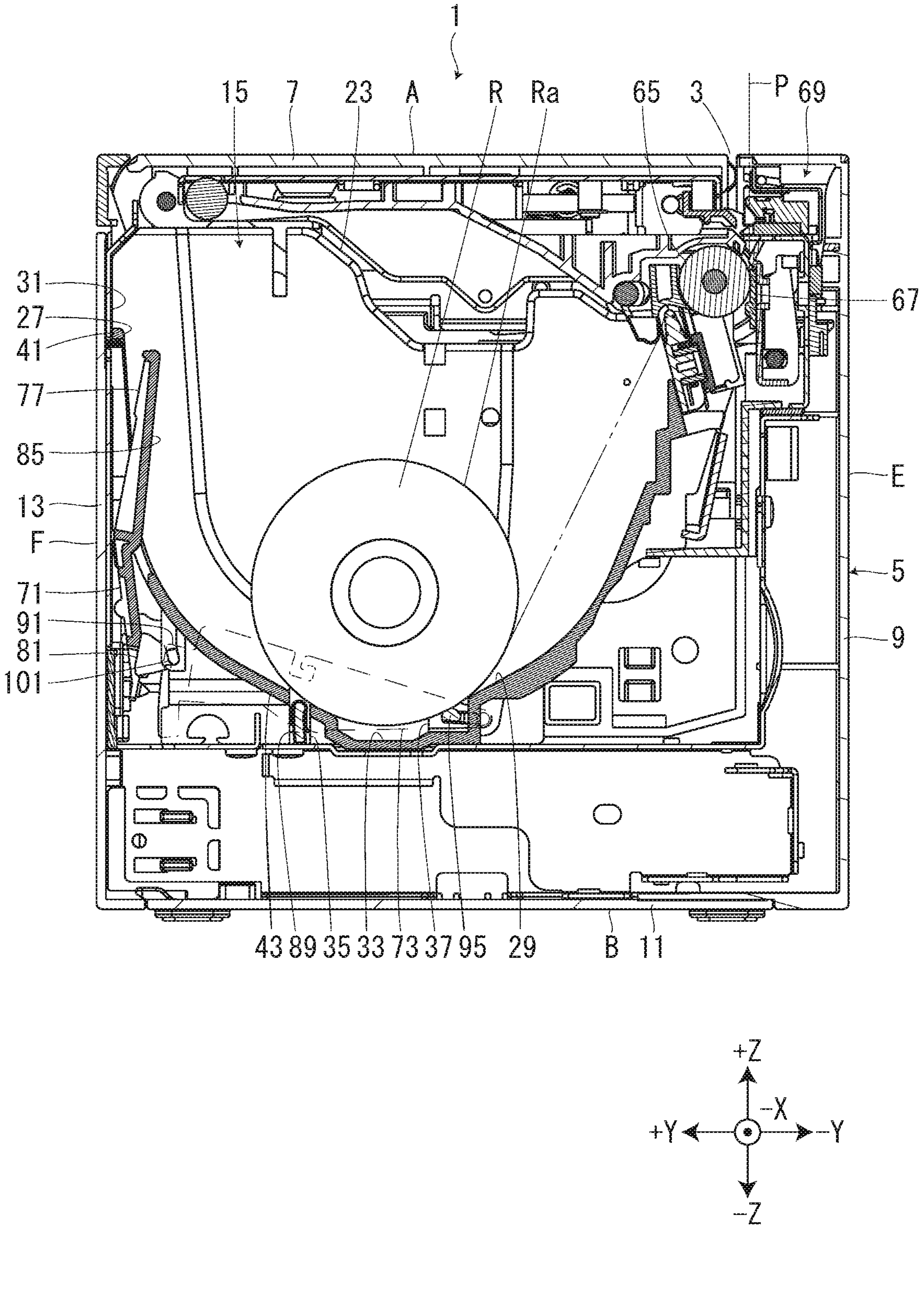
FIG. 15 is a cross-sectional view illustrating a state in which the diameter of the roll paper accommodated in the roll paper compartment is smaller than the fourth diameter and larger than a second diameter in the printing apparatus installed in the second posture.
Figure 16:
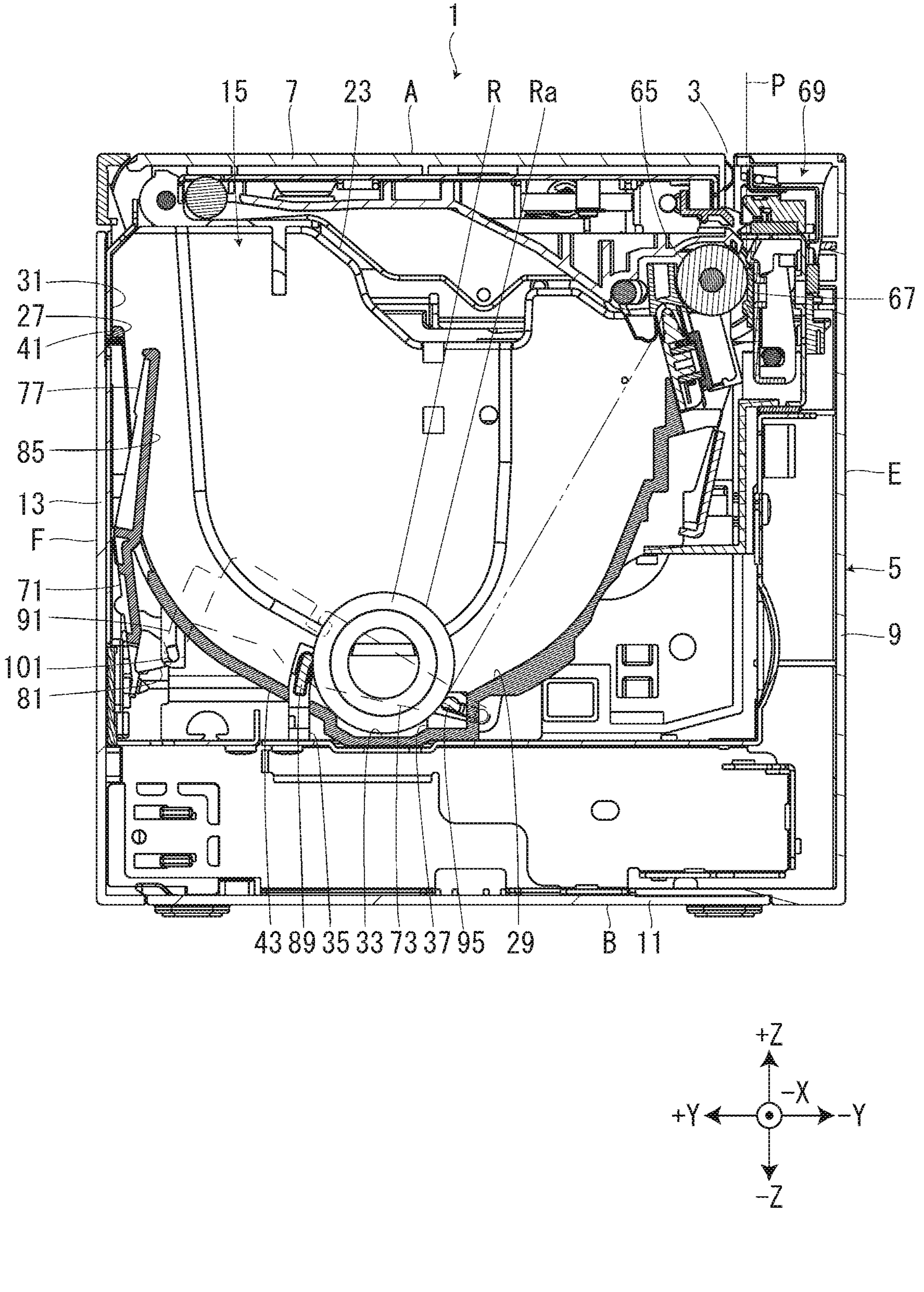
FIG. 16 is a cross-sectional view illustrating a state in which the diameter of the roll paper accommodated in the roll paper compartment is smaller than the second diameter in the printing apparatus installed in the second posture.

Referring to FIGS. 14 to 16, when the printing apparatus 1 is installed in the second posture, as the recording paper P is consumed and the diameter of the roll paper R decreases, how the first rotating lever 71 and the second rotating lever 73 operates will be explained. In the following description, a second diameter means is a diameter of the roll paper R that serves as a threshold for determining whether or not the second projecting/retracting portion 89 protrudes from the second placement surface 29 when the printing apparatus 1 is installed in the second posture. A fourth diameter means a diameter of the roll paper R that serves as a threshold for determining whether or not the first projecting/retracting portion 77 protrudes from the first placement surface 27 when the printing apparatus 1 is installed in the second posture. The second diameter is smaller than the fourth diameter. When the diameter of the roll paper R is smaller than the second diameter, it can be said that the roll paper R has reached the near-end state. The second diameter may be the same value as the first diameter, or may be a different value. The fourth diameter may be the same value as the third diameter described above, or may be a different value.

As illustrated in FIG. 14, when an unused roll paper R, that is, the roll paper R having a diameter larger than the fourth diameter is loaded into the roll paper compartment 15 and the outer peripheral surface Ra of the roll paper R is placed on the second placement surface 29, the first projecting/retracting portion 77 is pressed by the roll paper R and retracted into the first placement surface 27, and the second projecting/retracting portion 89 is pressed by the roll paper R and retracted into the second placement surface 29. Accordingly, the first blocking portion 81 blocks the space between the light guide tube 101 and the light receiving element 99, and the second blocking portion 91 blocks the space between the light guide tube 101 and the light receiving element 99. Therefore, the optical sensor 75 outputs the first signal. Based on the first signal received from the optical sensor 75, the control circuit determines that the near-end state is not reached.

As illustrated in FIG. 15, when the recording paper P is consumed to some extent and the diameter of the roll paper R is larger than the second diameter but smaller than the fourth diameter, the first projecting/retracting portion 77 is released from the pressure by the roll paper R and protrudes from the first placement surface 27. Meanwhile, the second projecting/retracting portion 89 is pressed by the roll paper R and remains retracted into the second placement surface 29. In this case, the first blocking portion 81 opens the space between the light guide tube 101 and the light receiving element 99, but the second blocking portion 91 keeps blocking the space between the light guide tube 101 and the light receiving element 99. Therefore, the optical sensor 75 outputs the first signal. The control circuit determines that the roll paper R is not in the near-end state based on the first signal received from the optical sensor 75.

As illustrated in FIG. 16, when the recording paper P is further consumed and the diameter of the roll paper R is smaller than the second diameter, the second projecting/retracting portion 89 is released from the pressure by the roll paper R, and protrudes from the second placement surface 29. The first projecting/retracting portion 77 remains protruding from the first placement surface 27. In this case, the second blocking portion 91 opens the space between the light guide tube 101 and the light receiving element 99. The first blocking portion 81 keeps the space between the light guide tube 101 and the light receiving element 99 open. Therefore, when the diameter of the roll paper R is smaller than the second diameter, the optical sensor 75 outputs the second signal. The control circuit determines that the roll paper R is in the near-end state based on the second signal received from the optical sensor 75. As described above, when the printing apparatus 1 is installed in the second posture, the first projecting/retracting portion 77 and the second projecting/retracting portion 89 protrude in this order as the diameter of the roll paper R decreases.

When the printing apparatus 1 is installed in the second posture, the second recess 33 is provided in the −Z direction with respect to the roll paper R placed on the second placement surface 29. When the diameter of the roll paper R is smaller than the second diameter, the roll paper R enters the second recess 33 (refer to FIG. 16). The roll paper R entering the second recess 33 means that the outer peripheral surface Ra of the roll paper R is in contact with the bottom surface of the second recess 33.

The second projecting/retracting portion 89 protrudes from the second placement surface 29 in the +Y direction with respect to the second recess 33, that is, on a side opposite to a side to which the recording paper P is pulled out with respect to the roll paper R that has entered the second recess 33. Therefore, even when an amount of protrusion of the second projecting/retracting portion 89 increases, it is possible to prevent the protruding second projecting/retracting portion 89 from obstructing the pulling out of the recording paper P. Therefore, the amount of protrusion of the second projecting/retracting portion 89 can increase, and the projection/retraction of the second projecting/retracting portion 89 can be easily detected by the optical sensor 75.

Further, when the diameter of the roll paper R is smaller than the second diameter, the second suppressor 95 protrudes from the second placement surface 29 together with the second projecting/retracting portion 89. The second suppressor 95 protrudes from the second placement surface 29 in the −Y direction with respect to the second recess 33, that is, on the side to which the recording paper P is pulled out with respect to the roll paper R that has entered the second recess 33. Therefore, the second suppressor 95 can prevent the roll paper R that has entered the second recess 33 from moving toward the platen roller 65 due to the recording paper P being pulled by the platen roller 65.

As described above, in the second rotating lever 73, the distance between the second suppressor 95 and the second shaft portion 93 is smaller than the distance between the second projecting/retracting portion 89 and the second shaft portion 93, and thus, the amount of protrusion of the second suppressor 95 is smaller than the amount of protrusion of the second projecting/retracting portion 89. Therefore, even when the second suppressor 95 protrudes from the second placement surface 29 on the side which the recording paper P is pulled out with respect to the roll paper R, it is possible to prevent the protruding second suppressor 95 from obstructing the pulling out of the recording paper P.

When the diameter of the roll paper R is larger than the fourth diameter, the roll paper R comes in sliding contact with the distal surface of the second projecting/retracting portion 89 (refer to FIG. 14), and when the diameter of the roll paper R approaches the second diameter, the roll paper R comes into sliding contact with a side surface of the distal end of the second projecting/retracting portion 89 (refer to FIG. 16). In this manner, the second projecting/retracting portion 89 is divided into the portion that comes into sliding contact with the roll paper R when the diameter of the roll paper R is large and the portion that comes into sliding contact with the roll paper R when the diameter of the roll paper R decreases. As a result, when the diameter of the roll paper R approaches the second diameter, the portion that comes into sliding contact with the roll paper R, that is, a side surface of the distal end of the second projecting/retracting portion 89, can be prevented from being worn due to friction with the roll paper R. Therefore, it is possible to suppress erroneous detection that the roll paper R is in the near-end state before the roll paper R reaches the near-end state.

As described above, the printing apparatus 1 of the present embodiment includes the roll paper compartment 15, the thermal head 67, the first projecting/retracting portion 77, the second projecting/retracting portion 89, and the optical sensor 75. The roll paper compartment 15 has the first placement surface 27 and the second placement surface 29. In a case where the printing apparatus 1 is installed in the first posture in which the first placement surface 27 becomes the bottom of the roll paper compartment 15, when the diameter of the roll paper R is larger than the first diameter, the first projecting/retracting portion 77 is pressed by the roll paper R where the outer peripheral surface Ra is placed on the first placement surface 27 and retracted into the first placement surface 27. When the diameter of the roll paper R is smaller than the first diameter, the first projecting/retracting portion 77 is released from the pressure by the roll paper R and protrudes from the first placement surface 27. In a case where the printing apparatus 1 is installed in the second posture in which the second placement surface 29 becomes the bottom of the roll paper compartment 15, when the diameter of the roll paper R is larger than the second diameter, the second projecting/retracting portion 89 is pressed by the roll paper R where the outer peripheral surface Ra is placed on the second placement surface 29 and retracted into the second placement surface 29. When the diameter of the roll paper R is smaller than the second diameter, the second projecting/retracting portion 89 is released from the pressure by the roll paper R and protrudes from the second placement surface 29. The optical sensor 75 detects the projection and retraction of the first projecting/retracting portion 77 and the projection and retraction of the second projecting/retracting portion 89.

According to this configuration, in a case where the printing apparatus 1 is installed in the first posture, when the diameter of the roll paper R is smaller than the first diameter, the first projecting/retracting portion 77 protrudes from the first placement surface 27, and the optical sensor 75 detects the protrusion of the first projecting/retracting portion 77. As a result, the printing apparatus 1 can detect that the diameter of the roll paper R is smaller than the first diameter, that is, the roll paper R is in the near-end state. Further, in a case where the printing apparatus 1 is installed in the second posture, when the diameter of the roll paper R is smaller than the second diameter, the second projecting/retracting portion 89 protrudes from the second placement surface 29, and the optical sensor 75 detects the protrusion of the second projecting/retracting portion 89. As a result, the printing apparatus 1 can detect that the diameter of the roll paper R has is smaller than the second diameter, that is, the roll paper R is in the near-end state. As described above, since the printing apparatus 1 of the present embodiment differs from a configuration in which the optical sensor 75 receives the detection light reflected by the roll paper R to detect the near-end state of the roll paper R, it is possible to avoid obstructing the detection of the near-end state of the roll paper R due to the blocking between the roll paper R and the optical sensor 75.

Other Modifications

It goes without saying that the present disclosure is not limited to the above-described embodiment, and that various configurations can be adopted without departing from the spirit of the embodiment. For example, the above embodiment can be modified into the following forms in addition to those described above. A configuration in which the embodiment and a modification are combined may be adopted.

The printing apparatus 1 is not limited to the configuration in which the optical sensor 75 detects the projection and retraction of the first projecting/retracting portion 77 and the projection and retraction of the second projecting/retracting portion 89, and it is also possible to detect the projection and retraction of the first projecting/retracting portion 77 and the projection and retraction of the second projecting/retracting portion 89 by a sensor of another type, such as a micro-switch. Further, the printing apparatus 1 may be configured to include a first sensor that detects the projection and retraction of the first projecting/retracting portion 77 and a second sensor that detects the projection and retraction of the second projecting/retracting portion 89. That is, the printing apparatus 1 may detect the projection and retraction of the first projecting/retracting portion 77 and the projection and retraction of the second projecting/retracting portion 89 using separate sensors. The printing apparatus 1 may be configured to include any one of the first projecting/retracting portion 77 and the second projecting/retracting portion 89, or may be configured to include three or more projecting/retracting portions. Similarly, the printing apparatus 1 may be configured to include any one of the first rotating lever 71 and the second rotating lever 73, or may be configured to include three or more rotating levers.

The first projecting/retracting portion 77 is not limited to a configuration in which the first projecting/retracting portion 77 projects from or retracts into the first placement surface 27 by rotating, and may have a configuration in which the first projecting/retracting portion 77 projects from or retracts into the first placement surface 27 by linearly moving forward or rearward, for example. Similarly, the second projecting/retracting portion 89 is not limited to a configuration in which the second projecting/retracting portion 89 projects from or retracts into the second placement surface 29 by rotating, and may have a configuration in which the second projecting/retracting portion 89 projects from or retracts into the second placement surface 29 by linearly moving forward or rearward, for example.

The printing apparatus 1 is not limited to the configuration in which the printing apparatus 1 can be installed in two postures such as the first posture and the second posture, and may have a configuration in which the printing apparatus 1 can be installed in one posture or a may have a configuration in which the printing apparatus 1 can be installed in three or more postures.

The printing method of the printing apparatus 1 is not limited to the thermal method, and may be, for example, an ink jet method or an electrophotographic method.

APPENDIX

A printing apparatus will be added below.

According to an aspect of the present disclosure, there is provided a printing apparatus including: a roll paper compartment having a placement surface on which an outer peripheral surface of a roll paper around which a recording paper is wound is placed and accommodating the roll paper; a printing section performing printing on the recording paper pulled out from the roll paper accommodated in the roll paper compartment; a projecting/retracting portion provided to be configured to project from or retract into the placement surface, pressed by the roll paper of which the outer peripheral surface is placed on the placement surface and retracting into the placement surface when a diameter of the roll paper is larger than a predetermined diameter, and released from the pressure by the roll paper and protruding from the placement surface when the diameter of the roll paper is smaller than the predetermined diameter; and a detection section detecting projection and retraction of the projecting/retracting portion.

This configuration differs from a configuration in which the detection section receives detection light reflected by the roll paper to detect a near-end state of the roll paper, it is possible to avoid obstructing the detection of the near-end state of the roll paper due to blocking between the roll paper and the detection section.

The first placement surface 27 is an example of the "placement surface". The second placement surface 29 is an example of the "placement surface". The thermal head 67 is an example of the "printing section". The first diameter is an example of the "predetermined diameter". The second diameter is an example of the "predetermined diameter". The first projecting/retracting portion 77 is an example of the "projecting/retracting portion". The second projecting/retracting portion 89 is an example of the "projecting/retracting portion".

In this case, the printing apparatus may further include a rotating lever rotatably provided and having the projecting/retracting portion and a blocking portion configured to block a space between a light emitting element and a light receiving element, the detection section may have an optical sensor including the light emitting element and the light receiving element, and the blocking portion may switch between a state in which the space between the light emitting element and the light receiving element is blocked and a state in which the space between the light emitting element and the light receiving element is open, depending on the projection and retraction of the projecting/retracting portion.

According to this configuration, by switching the state in which the space between the light emitting element and the light receiving element is blocked and the state in which the space between the light emitting element and the light receiving element is open according to the projection and retraction of the projecting/retracting portion, it is possible to detect the projection and retraction of the projecting/retracting portion.

The first blocking portion 81 is an example of the "blocking portion". The second blocking portion 91 is an example of the "blocking portion". The first rotating lever 71 is an example of the "rotating lever". The second rotating lever 73 is an example of the "rotating lever".

In this case, the optical sensor may be provided outside the roll paper compartment.

According to this configuration, paper dust generated from the roll paper accommodated in the roll paper compartment is less likely to reach the optical sensor, and thus, it is possible to suppress reduction in detection accuracy of the optical sensor due to the paper dust on the optical sensor.

In this case, at least one of the light emitting element and the light receiving element may be provided outside the roll paper in a width direction of the roll paper.

According to this configuration, the paper dust generated from the roll paper accommodated in the roll paper compartment is less likely to reach the light emitting element or the light receiving element provided outside the roll paper in the width direction of the roll paper, it is possible to suppress the reduction in the detection accuracy of the optical sensor due to the paper dust on the light emitting element or the light receiving element.

In this case, the placement surface may be inclined so that the roll paper moves in a first direction as the diameter of the roll paper decreases, and after the roll paper is moved in the first direction, the projecting/retracting portion protruding from the placement surface may be located in a second direction opposite to the first direction with respect to the roll paper.

According to this configuration, the projecting/retracting portion protruding from the placement surface prevents the roll paper from moving in the second direction. As a result, it is possible to prevent the projecting/retracting portion from being pushed by the roll paper that has moved in the second direction and retracted again, and it is possible to suppress erroneous detection that the roll paper is not in the near-end state.

The −Y direction is an example of the "first direction". The +Y direction is an example of the "second direction".

In this case, the printing apparatus may further include an opening/closing cover opening or closing the roll paper compartment, in which the opening/closing cover may be provided in the first direction with respect to the placement surface.

According to this configuration, as the diameter of the roll paper decreases, the roll paper moves toward the opening/closing cover. Therefore, when a user opens the opening/closing cover to replace the roll paper, the user can easily take out the near-end roll paper.

In this case, the projecting/retracting portion may project from or retract into the placement surface on a side opposite to a side to which the recording paper is pulled out with respect to the roll paper.

According to this configuration, even when an amount of protrusion of the projecting/retracting portion increases, it is possible to prevent the protruding projecting/retracting portion from obstructing pulling out of the recording paper.

In this case, the printing apparatus may further include a suppressor provided to be configured to project from or retract into the placement surface and protruding from the placement surface at an amount of protrusion smaller than that of the projecting/retracting portion on a side to which the recording paper is pulled out with respect to the roll paper when the diameter of the roll paper is smaller than the predetermined diameter.

According to this configuration, the suppressor can suppress the movement of the roll paper toward the side to which the recording paper is pulled out. In addition, since the amount of protrusion of the suppressor is small, it is possible to prevent the protruding suppressor from obstructing the pulling out of the recording paper.

The second suppressor 95 is an example of the "suppressor".

In this case, the roll paper compartment may be configured to alternatively accommodate the roll paper having a first width and the roll paper having a second width wider than the first width, and the projecting/retracting portion may project from or retract into an overlapping region of the placement surface in which a narrow region in which the outer peripheral surface of the roll paper having the first width is placed and a wide region in which the outer peripheral surface of the roll paper having the second width is placed overlap.

According to this configuration, both when the roll paper having the first width is accommodated in the roll paper compartment and when the roll paper having the second width is accommodated in the roll paper compartment, the projecting/retracting portion is pressed by the outer peripheral surface of the roll paper and retracted into the placement surface. Therefore, both when the roll paper having the first width is accommodated in the roll paper compartment and when the roll paper having the second width is accommodated in the roll paper compartment, it is possible to detect whether or not the roll paper is in the near-end state.

The first narrow region 45 is an example of the "narrow region". The second narrow region 53 is an example of a "narrow region". The first wide region 47 is an example of the "wide region". The second wide region 55 is an example of the "wide region". The first overlapping region 49 is an example of the "overlapping region". The second overlapping region 57 is an example of the "overlapping region".

What is claimed is:

1. A printing apparatus comprising:

a roll paper compartment having a placement surface on which an outer surface of a roll paper is placed and accommodating the roll paper;

a printing section performing printing on a recording paper pulled out from the roll paper accommodated in the roll paper compartment;

a projecting/retracting portion configured to project from or retract into the placement surface;

a detection section detecting projection and retraction of the projecting/retracting portion and having an optical sensor that includes a light emitting element and a light receiving element;

a rotating lever rotatably provided and having the projecting/retracting portion and a blocking portion configured to block a space between the light emitting element and the light receiving element; and a suppressor configured to project from or retract into the placement surface, and the suppressor protruding from the placement surface at an amount of protrusion smaller than that of the projecting/retracting portion, on a side to which the recording paper is pulled out with respect to the roll paper, when a diameter of the roll paper is smaller than a predetermined diameter; wherein the projecting/retracting portion is pressed by the roll paper of which the outer surface is placed on the placement surface and retracts into the placement surface when the diameter of the roll paper is larger than the predetermined diameter, the projecting/retracting portion is released from the pressure by the roll paper and projects from the placement surface when the diameter of the roll paper is smaller than the predetermined diameter, and the blocking portion switches between a state in which the space between the light emitting element and the light receiving element is blocked and a state in which the space between the light emitting element and the light receiving element is open, depending on the projection and retraction of the projecting/retracting portion.

2. The printing apparatus according to claim 1, wherein the optical sensor is provided outside the roll paper compartment.

3. The printing apparatus according to claim 1, wherein at least one of the light emitting element and the light receiving element is provided outside the roll paper in a width direction of the roll paper.

4. The printing apparatus according to claim 1, wherein the placement surface is inclined so that the roll paper moves in a first direction as the diameter of the roll paper decreases, and after the roll paper is moved in the first direction, the projecting/retracting portion protruding from the placement surface is located in a second direction opposite to the first direction with respect to the roll paper.

5. The printing apparatus according to claim 4, further comprising:

an opening/closing cover opening or closing the roll paper compartment, wherein the opening/closing cover is provided in the first direction with respect to the placement surface.

6. The printing apparatus according to claim 1, wherein the projecting/retracting portion projects from or retracts into the placement surface on a side opposite to a side which the recording paper is pulled out with respect to the roll paper.

7. The printing apparatus according to claim 1, wherein the roll paper compartment is configured to alternatively accommodate the roll paper having a first width and the roll paper having a second width wider than the first width, and the projecting/retracting portion projects from or retracts into an overlapping region of the placement surface that includes a narrow region in which the outer surface of the roll paper having the first width is placed and a wide region in which the outer surface of the roll paper having the second width is overlappingly placed.

8. A printing apparatus comprising:

a roll paper compartment having a surface on which an outer surface of a roll paper is placed and configured to accommodate the roll paper;

a printing section performing printing on a recording paper pulled out from the roll paper;

a protrusion released from a pressure by the roll paper and protruding from the surface of the roll paper compartment when a diameter of the roll paper is smaller than a predetermined diameter;

a detection section detecting a protruding state of the protrusion;

a rotating lever rotatably provided and having the protrusion and a blocking portion configured to block a space between a light emitting element and a light receiving element; and a suppressor protruding from the surface of the roll paper compartment at an amount of protrusion smaller than that of the protrusion, on a side to which the recording paper is pulled out with respect to the roll paper, when the diameter of the roll paper is smaller than the predetermined diameter; wherein the detection section has an optical sensor including a light emitting element and a light receiving element, and the blocking portion switches between a state in which the space between the light emitting element and the light receiving element is blocked and a state in which the space between the light emitting element and the light receiving element is open, depending on the protruding state of the protrusion.

9. The printing apparatus according to claim 8, wherein the optical sensor is provided outside the roll paper compartment.

10. The printing apparatus according to claim 8, wherein at least one of the light emitting element and the light receiving element is provided outside the roll paper in a width direction of the roll paper.

11. The printing apparatus according to claim 8, wherein the surface of the roll paper compartment is inclined so that the roll paper moves in a first direction as the diameter of the roll paper decreases, and after the roll paper is moved in the first direction, the protrusion protruding from the surface of the roll paper compartment is located in a second direction opposite to the first direction with respect to the roll paper.

12. The printing apparatus according to claim 11, further comprising:

an opening/closing cover opening or closing the roll paper compartment, wherein the opening/closing cover is provided in the first direction with respect to the surface of the roll paper compartment.

13. The printing apparatus according to claim 8, wherein the protrusion protrudes from the surface of the roll paper compartment on a side opposite to a side to which the recording paper is pulled out with respect to the roll paper.

14. The printing apparatus according to claim 8, wherein the roll paper compartment is configured to alternatively accommodate the roll paper having a first width and the roll paper having a second width wider than the first width, and the protrusion protrudes from an overlapping region of the surface of the roll paper compartment that includes a narrow region facing the outer surface of the roll paper having the first width and a wide region facing the outer surface of the roll paper having the second width.

* * * * *